US011077528B2

(12) United States Patent
Noda

(10) Patent No.: US 11,077,528 B2
(45) Date of Patent: Aug. 3, 2021

(54) METHOD OF MANUFACTURING AND MANUFACTURING APPARATUS FOR AN ASSEMBLED PRODUCT

(71) Applicant: HIRATA CORPORATION, Kumamoto (JP)

(72) Inventor: Mitsuhiro Noda, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 23 days.

(21) Appl. No.: 15/938,534

(22) Filed: Mar. 28, 2018

(65) Prior Publication Data
US 2018/0281131 A1    Oct. 4, 2018

(30) Foreign Application Priority Data
Mar. 28, 2017  (JP) .............................. JP2017-064029

(51) Int. Cl.
*B23P 19/04*    (2006.01)
*F16J 15/3268*  (2016.01)
*B23P 19/08*    (2006.01)

(52) U.S. Cl.
CPC ........... *B23P 19/047* (2013.01); *B23P 19/084* (2013.01); *F16J 15/3268* (2013.01)

(58) Field of Classification Search
CPC .... B23P 19/084; B23P 19/047; F16J 15/3268; B25B 27/28
(Continued)

(56) References Cited

U.S. PATENT DOCUMENTS 3,605,239 A * 9/1971 Eschholz .............. B23P 19/084
29/717
6,494,516 B1 * 12/2002 Bertini .................. B23P 19/084
294/119.1
(Continued)

FOREIGN PATENT DOCUMENTS

CN    103649494 A    3/2014
CN    104874988 A    9/2015
(Continued)

OTHER PUBLICATIONS

Office Action (Notice of Reasons for Refusal) dated Apr. 6, 2021, by the Japanese Patent Office in corresponding Japanese Patent Application No. 2017-064029 and English translation of the Office Action. (16 pages).
(Continued)

*Primary Examiner* — Christopher M Koehler
(74) *Attorney, Agent, or Firm* — Buchanan Ingersoll & Rooney PC

(57) ABSTRACT

A method of manufacturing produces an assembled product where a ring-shaped seal is attached to a channel in an inner circumferential surface of a ring-shaped component. The method includes: a holding step that moves an engaged portion of the seal inwardly in a radial direction using a deformation member, while restricting movement of the seal in a direction parallel to an inner circumferential wall of the channel, to cause deformation so that the outer diameter of part of the seal aside from the engaged portion becomes smaller than the channel inner circumferential diameter; and an attachment step that attaches the seal to the channel by releasing the seal to restore the seal from the deformation. The attachment step includes releasing the seal by releasing engagement by the deformation member and moving the
(Continued)

seal body inside the channel while pressing out the seal body from inside.

6 Claims, 12 Drawing Sheets

(58) Field of Classification Search
USPC .................................... 29/451, 235, 522.1
See application file for complete search history.

(56) References Cited

U.S. PATENT DOCUMENTS

| | | | | |
|---|---|---|---|---|
| 6,722,011 | B1* | 4/2004 | Bacon | .................... B23P 19/084 29/222 |
| 2014/0241858 | A1 | 8/2014 | Tashiro et al. | |
| 2018/0339379 | A1* | 11/2018 | Noda | .................... B23P 19/084 |

FOREIGN PATENT DOCUMENTS

| | | |
|---|---|---|
| CN | 105537923 A | 5/2016 |
| CN | 106239423 A | 12/2016 |
| CN | 106271585 A | 1/2017 |
| JP | S55-005247 A | 1/1980 |
| JP | H04-210333 A | 7/1992 |
| JP | H07-308828 A | 11/1995 |
| JP | H09-309032 A | 12/1997 |
| JP | 2003-011024 A | 1/2003 |
| JP | 2007-229877 A | 9/2007 |
| JP | 2015-160285 A | 9/2015 |

OTHER PUBLICATIONS

Office Action dated Nov. 13, 2019, by the Chinese Patent Office in corresponding Chinese Patent Application No. 201810262710.X and English translation of the Office Action. (14 pages).

* cited by examiner

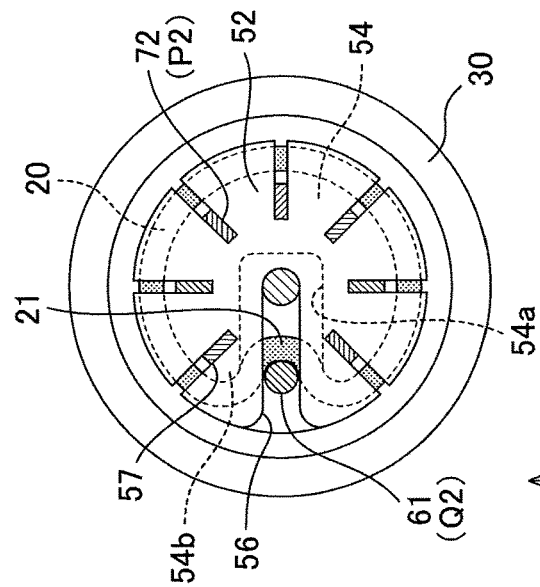
FIG 8 (C)
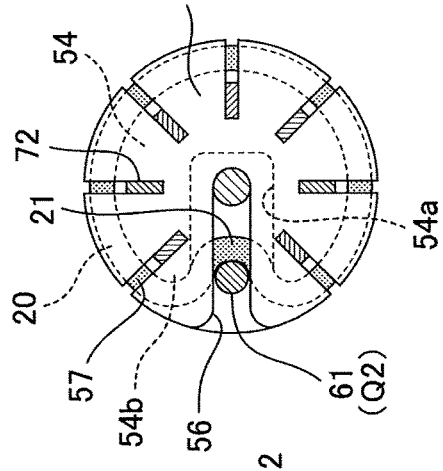
FIG 8 (B)
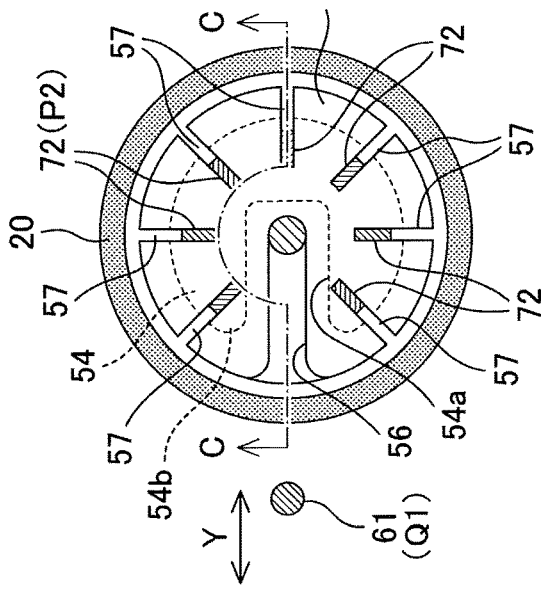
FIG 8 (A)
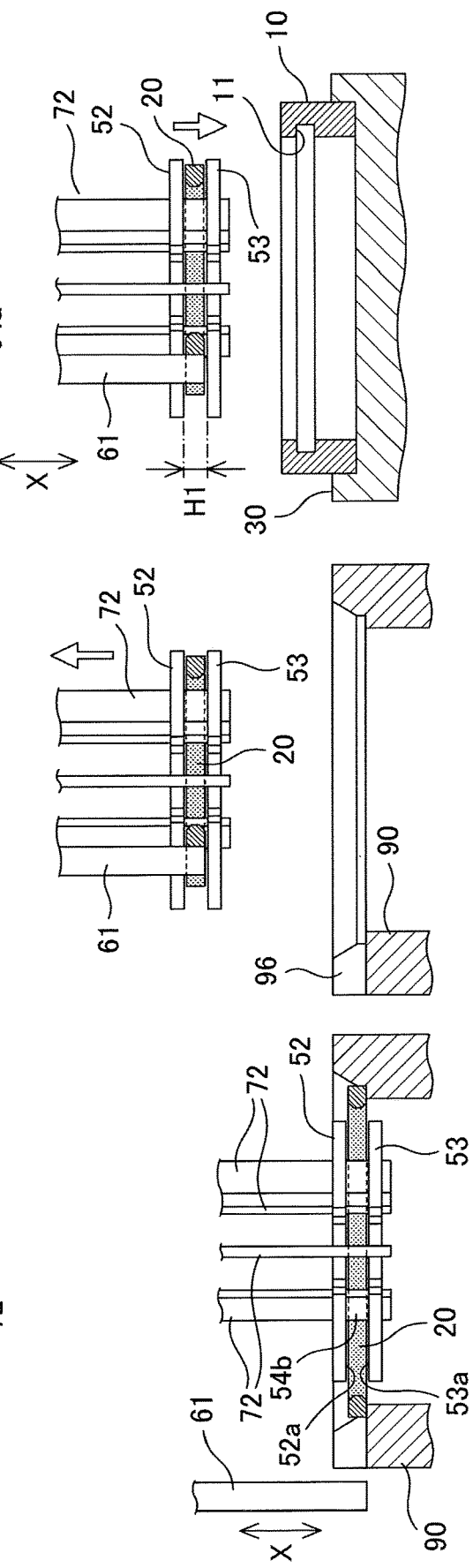

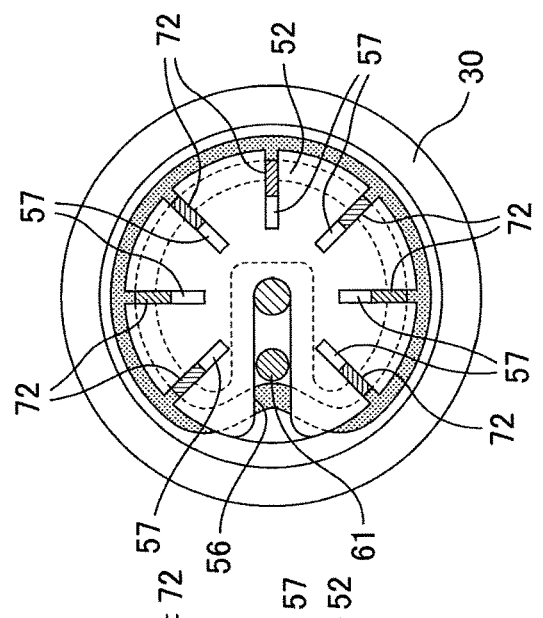
FIG 9 (A)
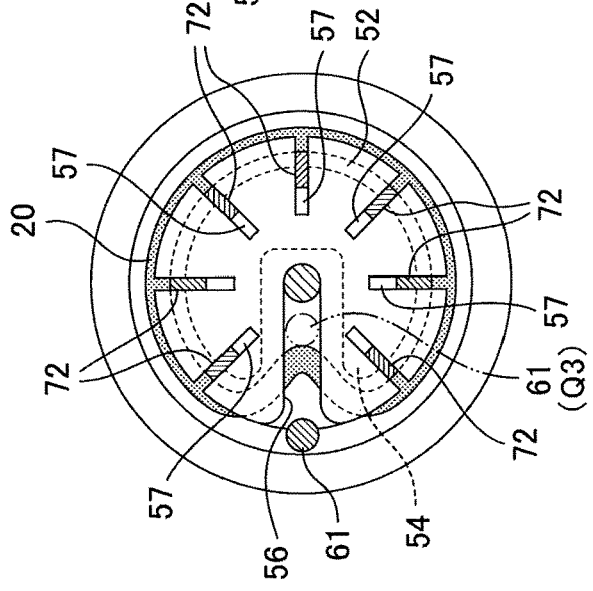
FIG 9 (B)
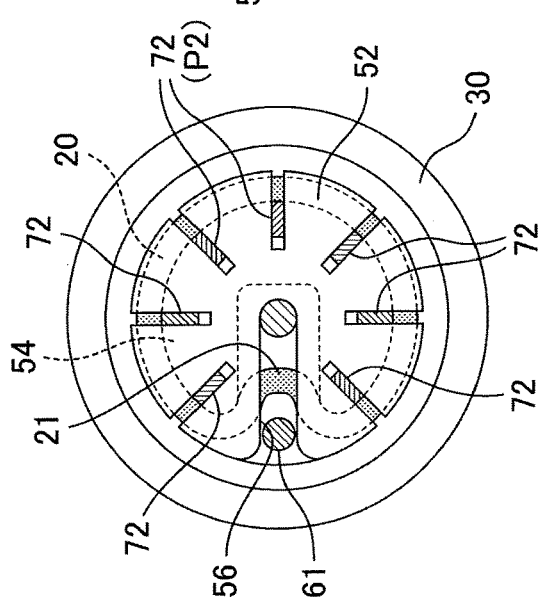
FIG 9 (C)
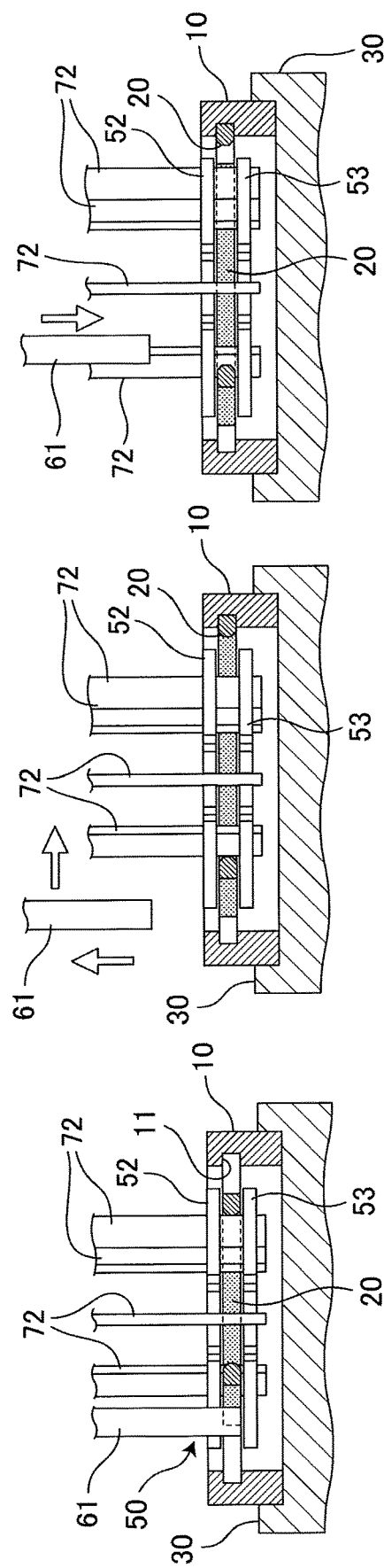

METHOD OF MANUFACTURING AND MANUFACTURING APPARATUS FOR AN ASSEMBLED PRODUCT

FIELD OF THE INVENTION

The present invention relates to a method of manufacturing and a manufacturing apparatus for manufacturing an assembled product (a ring-member attached product) that has an attached part attached to a component main body.

BACKGROUND ART

There are apparatuses that attach a ring-shaped attached part (for example, an O ring) provided with elasticity into a ring-shaped channel formed in an inner circumferential wall of a hole provided in a component main body. Example apparatuses cause deformation in the size of a directional ring, move the ring inside the hole in the component main body, and attach the ring to the ring-shaped channel by having the ring return to its original shape (see Patent Literature 1 and 2 indicated below).

The apparatus in Patent Literature 1 first causes deformation in an elastic seal by having the (undeformed) elastic seal engaged by a deforming mechanism provided at a predetermined position. After this, the deformed elastic seal is clamped in the up-down direction by a holding mechanism of a conveying apparatus, not illustrated, to fix the elastic seal in the deformed state, and the engagement of the elastic seal with the deforming mechanism is released. Next, the elastic seal that is held by the holding mechanism and kept in the deformed state is transported by the conveying apparatus from the predetermined position to inside the hole of a disc brake caliper, the clamping by the holding mechanism is released, and the elastic seal is restored to its original shape by the elastic force of the elastic seal, thereby attaching the elastic seal to the ring-shaped channel formed in the inner circumferential wall of the hole. To complete the attachment of the elastic seal to the ring-shaped channel, a plurality of pressing rollers are then pressed against the inner circumference of the elastic seal to move the elastic seal in the circumferential direction around the inner circumference.

The apparatus disclosed in Patent Literature 2 holds part of an O ring by clamping in the up-down direction with a pair of O ring clamping members, causes the O ring to deform by pulling the O ring inward, transports the O ring in this state, and then releases the inward pulling and clamping to restore the O ring to its original shape using the elastic force of the elastic seal, thereby attaching the O ring to an O ring channel formed in the inner circumferential surface of a workpiece.

CITATION LIST

Patent Literature

[Patent Document 1]
  Japanese Laid-open Patent Publication No. 2003-011024
[Patent Document 2]
  Japanese Laid-open Patent Publication No. 2015-160285

SUMMARY OF THE INVENTION

However, an attached part such as a ring is made of an elastic material such as rubber, and is therefore prone to irregular deformation. Accordingly, when deformation is caused by applying an external force to an attached part before attachment, there is a tendency for parts of the attached part to become stretched, compressed, or twisted, and/or for the outer circumferential side and inner circumferential side of the ring to become inside out, making it difficult to produce the intended deformation state. When the ring deforms, there is a fall in the elastic force as the diameter increases or as the thickness decreases.

With the apparatus in Patent Literature 1 indicated above, since the deformed elastic seal is conveyed in a state where the elastic seal has been fixed by clamping from above and below, after the clamping is released, there is the risk of the elastic seal being attached to the channel while still in a deformed state. Although the ring is attached to the channel by placing the ring in the channel and then moving the ring in the circumferential direction while pressing the ring toward the channel from the inner circumference using pressing rollers, if the ring remains deformed and does not return to a shape that can be pressed into the channel, the ring will end up being pressed in the deformed state toward the attachment channel by the pressing rollers that move in the circumferential direction, resulting in the risk of the ring becoming caught between the circumferential surface of the attachment channel and the pressing surfaces of the rollers.

Also, with the apparatus according to Patent Literature 2, since deformation is caused by clamping part of the O ring in the up-down direction and pulling with a pair of clamping members, a large stretching force is applied to only part of the O ring and there is the risk of the O ring being attached to the channel in a partially stretched state. Since this apparatus depends on the ring returning due to the elastic force of the ring, it is not possible to attach rings that have a weak elastic force (i.e., the elastic range is narrow)

The present invention was conceived in view of the problems described above and has an object of providing a method of manufacturing a product and a manufacturing apparatus that are capable, when attaching a ring-shaped attached part to a channel in a ring-shaped component main body, of attaching the attached part to the channel in a predetermined posture.

According to an aspect of the present invention, there is provided a method of manufacturing an assembled product where a ring-shaped seal body is attached to a ring-shaped attachment channel formed in an inner circumferential surface of a ring-shaped component main body. The method includes: a holding step that moves an engaged portion of the seal body inwardly in a radial direction using a deformation engagement member, which is capable of moving in the radial direction between a standby position on an outside of an outer edge of the seal body and a holding position that is inside the standby position in a radial direction while restricting movement of the seal body in a direction that is parallel to an inner circumferential wall of the attachment channel, causes deformation so that an outer diameter of the seal body becomes smaller than an inner circumferential diameter of the attachment channel, and holds the seal body in a state where the seal body is engaged by the deformation engagement member at the holding position; and an attachment step that releases holding of the seal body held in the deformed state in the holding step while restricting movement of the seal body in the parallel direction to return the seal body to a widened state and attach the seal body to the attachment channel of the component main body, wherein the attachment step includes: a releasing step of releasing engagement of the deformation engagement member with the seal body held in the deformed state to release a held state of the seal body; and a movement step of moving the seal body inside the attachment channel while outwardly pressing the seal body from an inside of the seal body.

In the holding step described above, it is preferable to cause deformation so that the outer diameter of the seal body becomes smaller than the inner circumferential diameter of the attachment channel while restricting movement of a part of the seal body aside from the engaged portion in the direction that is parallel to the inner circumferential wall of the attachment channel. In the attachment step, after the holding is released, it is possible for the seal body to return to the original widened state.

The movement step may include: a first attachment step that moves a plurality of diameter-expanding movement members, which are capable of moving in the radial direction between movement standby positions where the diameter-expanding movement members contact the inside of the seal body that has been deformed in the holding step and attachment positions that are outside the movement standby positions in the radial direction, from the movement standby positions to the attachment positions to attach the seal body to the attachment channel of the component main body; and a second attachment step that attaches the seal body to the attachment channel of the component main body by causing the deformation engagement member to contact the engaged portion of the seal body from an inside and moving the deformation engagement member to the outside in the radial direction.

The seal body may have a first facing surface that faces one inner wall out of a pair of inner walls of the attachment channel when the seal body is attached to the attachment channel, and a second facing surface that faces another inner wall, and the holding step and the attachment step may move the seal body in the radial direction while restricting the first facing surface and the second facing surface.

The seal body may include an inner circumferential portion that tapers toward an inner circumferential edge side of the seal body and an outer circumferential portion that is formed with a surface that is parallel to the inner circumferential wall, and the attachment step may attach the seal body to the attachment channel in a state where the outer circumferential portion of the seal body is kept on an outside of the seal body.

The method of manufacturing may include: a seal preparing step that places a seal body before holding at a predetermined position; and a component main body preparing step that places a component main body before attachment of the seal body at an attachment position.

Another aspect of the present invention is an attachment unit that attaches a seal body and is used in a manufacturing apparatus that manufactures an assembled product, which includes a component main body and a ring-shaped seal body that has been attached to a ring-shaped inner circumferential surface of the component main body, the attachment unit including: a ring holding portion that supports the ring-shaped seal body to be attached to a ring-shaped channel formed in the inner circumferential surface of the component main body; a deformation mechanism that moves the engaged portion of the seal body, moves the engaged portion inward in a radial direction to cause deformation of the seal body, and holds the seal body by acting in concert with the ring holder unit; and a ring attaching mechanism that moves the seal body supported by the ring holding portion to the attachment channel and attaches the seal body by acting in concert with the deformation mechanism, wherein the deformation mechanism includes a deformation engagement member that engages the engaged portion of the seal body and moves the engaged portion inward in the radial direction.

The ring holding portion may include: a pair of guide portions whose diameter is smaller than the inner circumferential diameter of the seal body and support the ring-shaped seal body while restricting deformation of the seal body in an intersecting direction that intersects the radial direction around a circumferential direction of the seal body and permitting movement of the seal body in the radial direction; a support portion that includes a first surface and a second surface that face the pair of guide portions and an engagement portion that engages part of an inner circumferential portion of the seal body, and is formed so as to be capable of housing the seal body whose diameter has been reduced; a plurality of cutaway portions provided, at predetermined intervals, in a radial direction from a center axis side of the pair of guide portions; and an engagement cutaway portion that permits movement of the deformation engagement member.

The deformation mechanism may include: the deformation engagement member that is capable of moving between an outer standby position set on an outer circumferential side of the ring holding portion and a holding position set on an inner circumferential side of the ring holding portion; a first deformation moving mechanism that reciprocally moves the deformation engagement member along the first surface between the outer standby position and the holding position; and a second moving mechanism that reciprocally moves the deformation engagement member in a direction that intersects the first surface between the holding position and an intersecting direction standby position.

The ring attachment mechanism may include: a plurality of ring attachment members that are capable of moving between attachment positions, a plurality of which are set at predetermined intervals in a circumferential direction on an outer circumferential side of the ring holding portion, and standby positions, a plurality of which are set at predetermined intervals in a circumferential direction on a center axis side of the ring holding portion; and an attachment moving mechanism that reciprocally moves the plurality of ring attaching members between the respective standby positions and the attachment positions.

The pair of guide portions may include: a first guide member that includes the first surface; and a second guide member that includes the second surface, wherein the first guide member and the second guide member may include a plurality of cutaway portions and the second guide member further includes an engagement cutaway portion.

The pair of guide portions may be provided with an intermediate member that is disposed between the first guide member and the second guide member and may include: a contacted surface that is contacted by the inner circumferential portion of the seal body; a movement permitting portion that permits movement of the deformation engagement member; and the engagement portion.

Yet another aspect of the present invention is a manufacturing apparatus for an assembled product that manufactures the assembled product by attaching a ring-shaped seal body to a ring-shaped channel formed in an inner circumferential surface of a ring-shaped component main body, the manufacturing apparatus including: a main body holding unit that holds the component main body at a predetermined position; a movement unit that moves at least one of the seal body and the component main body relative to another of the seal body and the component main body to position the seal body inside a hollow portion of the component main body; and any of the attachment units described above that attaches the seal body to the channel.

The manufacturing apparatus may further include a loading member, onto which a seal body to be held by the ring holding portion is loaded, wherein the loading member may include a restricting portion, which is formed with a larger diameter than an outer diameter of the seal body and restricts an outer circumferential surface of the seal body, and a loading surface, which is provided on a different side of the loading member to the restricting portion and onto which the seal body is loaded.

The restricting portion may include a connecting channel that permits movement of the deformation engagement member.

With the method of manufacturing according to the present invention, when attaching a ring-shaped attached part to a channel of a ring-shaped component main body, it is possible to reliably attach the attached part in a predetermined posture set in advance. Accordingly, it is possible to improve the manufacturing yield of assembled products.

BRIEF DESCRIPTION OF DRAWINGS

FIGS. 8A to 8C are diagrams useful in explaining the operation of a manufacturing apparatus and a method of manufacturing an assembled product;

FIGS. 9A to 9C are diagrams useful in explaining the operation of a manufacturing apparatus and a method of manufacturing an assembled product;

REFERENCE SIGNS

Figure 1:
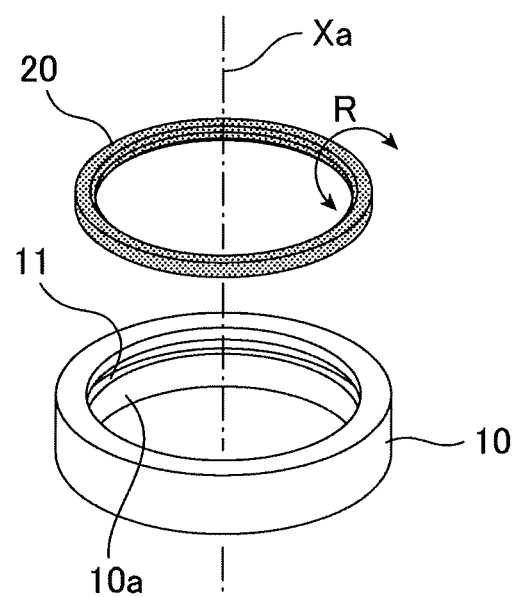
FIG. 1A is an exploded perspective view of an assembled product to be manufactured.
FIG. 1B is a perspective view of the assembled product to be manufactured.
FIG. 1C is a cross-sectional view depicting an A-A section in FIG. 1B.
Figure 1:
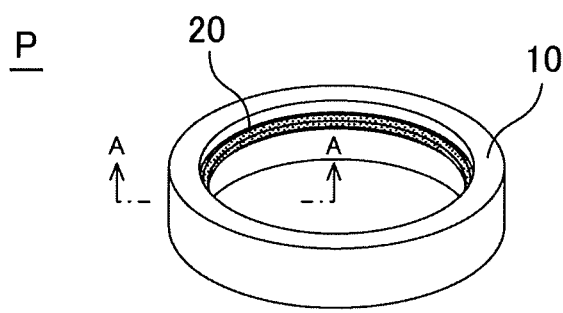
Figure 1:
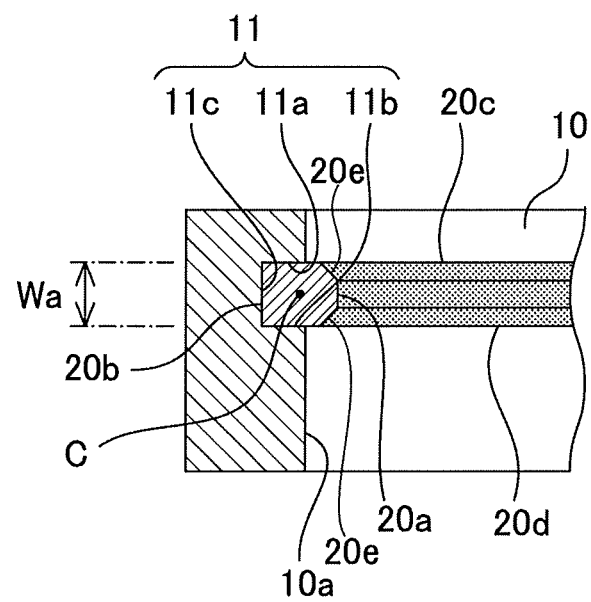

1 . . . manufacturing apparatus
10 . . . component main body
10$a$ . . . inner circumferential surface
11 . . . ring-shaped channel (or "attachment channel")
11$a$ . . . one inner wall (or "first inner wall")
11$b$ . . . other inner wall (or "second inner wall")
11$c$ . . . inner circumferential wall (or "third inner wall")
20 . . . seal body (or "attached part")
20$a$ . . . seal body inner circumferential surface
20$b$ . . . seal body outer circumferential surface
20$c$ . . . seal body upper surface (or "first facing surface")
20$d$ . . . seal body lower surface (or "second facing surface")
20$e$ . . . inclined surface
21 . . . engaged portion of seal body (or "engaged portion")
30 . . . main body holding unit
40 . . . attachment unit
40$a$ . . . support member
41 . . . attachment unit main body
41$a$ . . . swinging shaft
42 . . . swinging supporting portion
50 . . . ring holding portion
51 . . . guide portion
52 . . . upper guide plate (or "upper guide member")
52$a$ . . . lower surface (or "facing surface")
53 . . . lower guide plate (or "lower guide member")
53$a$ . . . upper surface (or "facing surface")
54 . . . intermediate member
54$a$ . . . engagement channel (or "movement permitting portion")
54$b$ . . . engagement portion
54$c$ . . . cutaway
54$d$ . . . inner wall (or "contacted surface")
54$e$ . . . intermediate outer circumferential portion
54$w$ . . . width of engagement channel
55 . . . support portion (or "support channel" or "holding channel")
56 . . . first cutaway portion (or "engagement cutaway portion")
57 . . . second cutaway portion (or "attachment cutaway portion")
60 . . . deforming mechanism
61 . . . deformation engagement member (or "pressing member")
62 . . . deformation moving mechanism
62$a$ . . . horizontal moving mechanism (or "first pressing mechanism")
62$b$ . . . vertical moving mechanism (or "second pressing mechanism")
70 . . . ring attaching mechanism
72 . . . ring attaching member (or diameter-expanding movement member")
72$a$ . . . lower end portion (or "other end")
72$b$ . . . upper end portion (or "one end")
73 . . . attachment moving mechanism
73$a$ . . . raising/lowering portion
73$b$ raising/lowering actuator
80 . . . moving unit
81 . . . horizontal moving mechanism
81$a$ . . . horizontal moving body
82 . . . raising/lowering mechanism
82$a$ . . . raising/lowering moving body
90 . . . loading member
91 . . . opening
93 . . . inclined portion (or "large diameter concave")
94 . . . reduced diameter portion (or "small diameter concave")
95 . . . loading portion
95$a$ . . . ring-shaped loading surface 95b . . . outer circumferential wall for positioning purposes (or "restricting portion")
96 . . . connecting channel
C . . . circumferential axis (center of a circumscribed circle on a cross section that is perpendicular to the circumferential direction of the ring-shaped seal body)
D1 . . . outer diameter of guide plate
D2 . . . outer diameter of intermediate member
Fa . . . biasing force
Fb . . . attachment force
H1 . . . height of intermediate member
P . . . assembled product (ring-member attached product)
P1 . . . attachment position (or "outer position")
P2 . . . movement standby position (or "inner position")
Q1 . . . outer standby position
Q2 . . . holding position
Q3 . . . upper standby position (standby position in intersecting direction)
Q4 . . . pressing readiness position
R . . . rotation that turns the seal body inside out
Wa . . . height of seal body
Wb . . . diagonal dimension of seal body
Wc . . . diagonal dimension of seal body
X . . . up-down direction (direction that is parallel to the inner circumferential walls of the attachment channel) (or "intersecting direction")
Xa . . . central axis direction of seal body (restricting direction that intersects the radial direction and circumferential direction of the seal body) (or "intersecting direction")
Xb . . . center axis of opening
Y . . . horizontal direction (or "radial direction)
Ya . . . radial direction
Yr . . . radial direction

DESCRIPTION OF THE PREFERRED EMBODIMENTS

Next, preferred embodiments of a manufacturing apparatus for an assembled product (a manufacturing apparatus for a ring-member attached product) according to the present invention (hereinafter simply "manufacturing apparatus") and a method of manufacturing used by such apparatus will be described with reference to the attached drawings.

As depicted in FIGS. 1A to 1C, the assembled product manufactured by the manufacturing apparatus and method of manufacturing according to the present embodiment is composed of a ring-shaped component main body 10 and a ring-shaped seal body (or "attached part") 20. With the manufacturing apparatus and method of manufacturing described here, an assembled product P is manufactured by attaching the ring-shaped seal body 20 to a ring-shaped channel (or "attachment channel") 11 formed on an inner circumferential surface 10a of the ring-shaped component main body 10.

Figure 2:
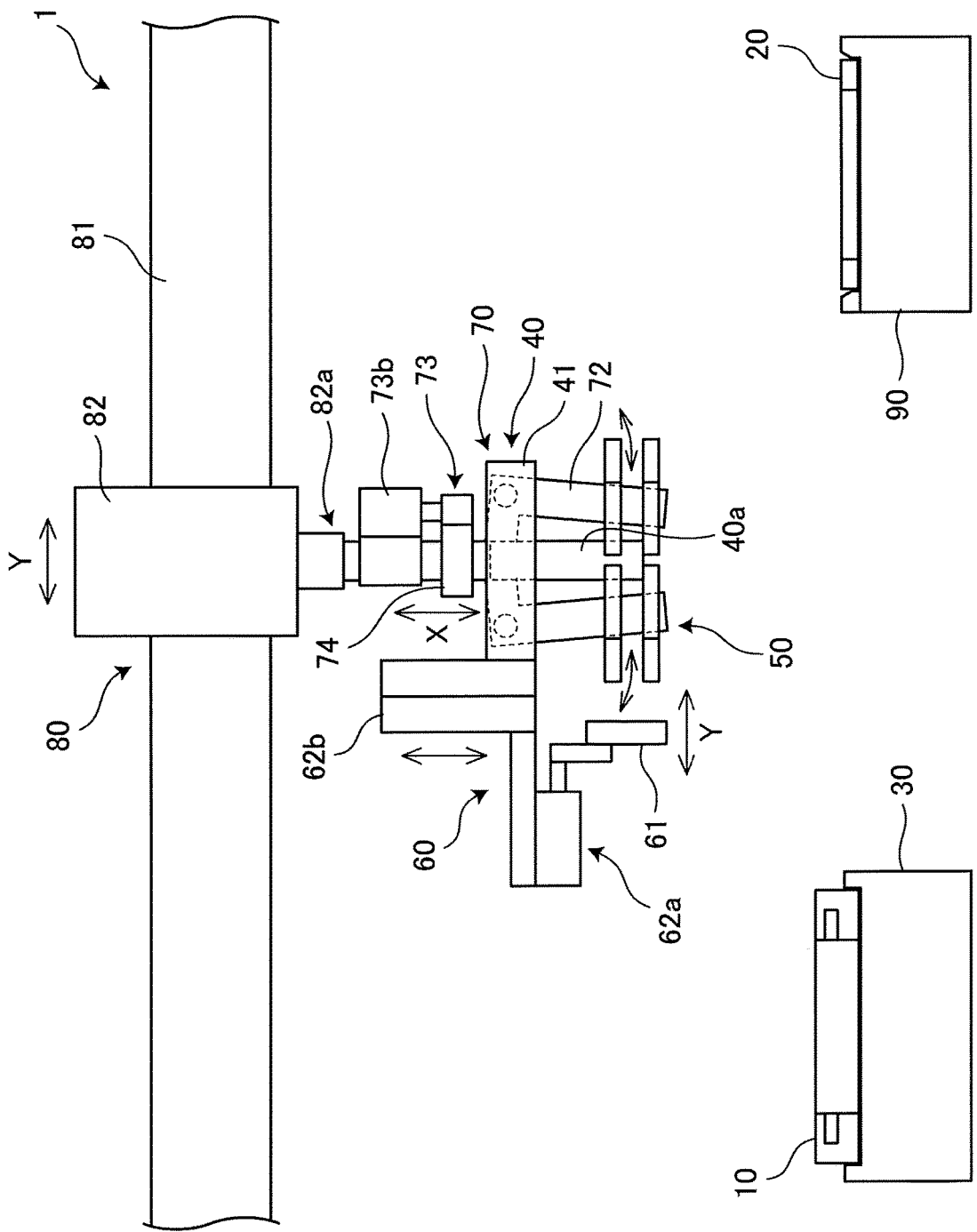
FIG. 2 is a schematic view depicting the configuration of a manufacturing apparatus according to an embodiment of the present invention.
Figure 3:
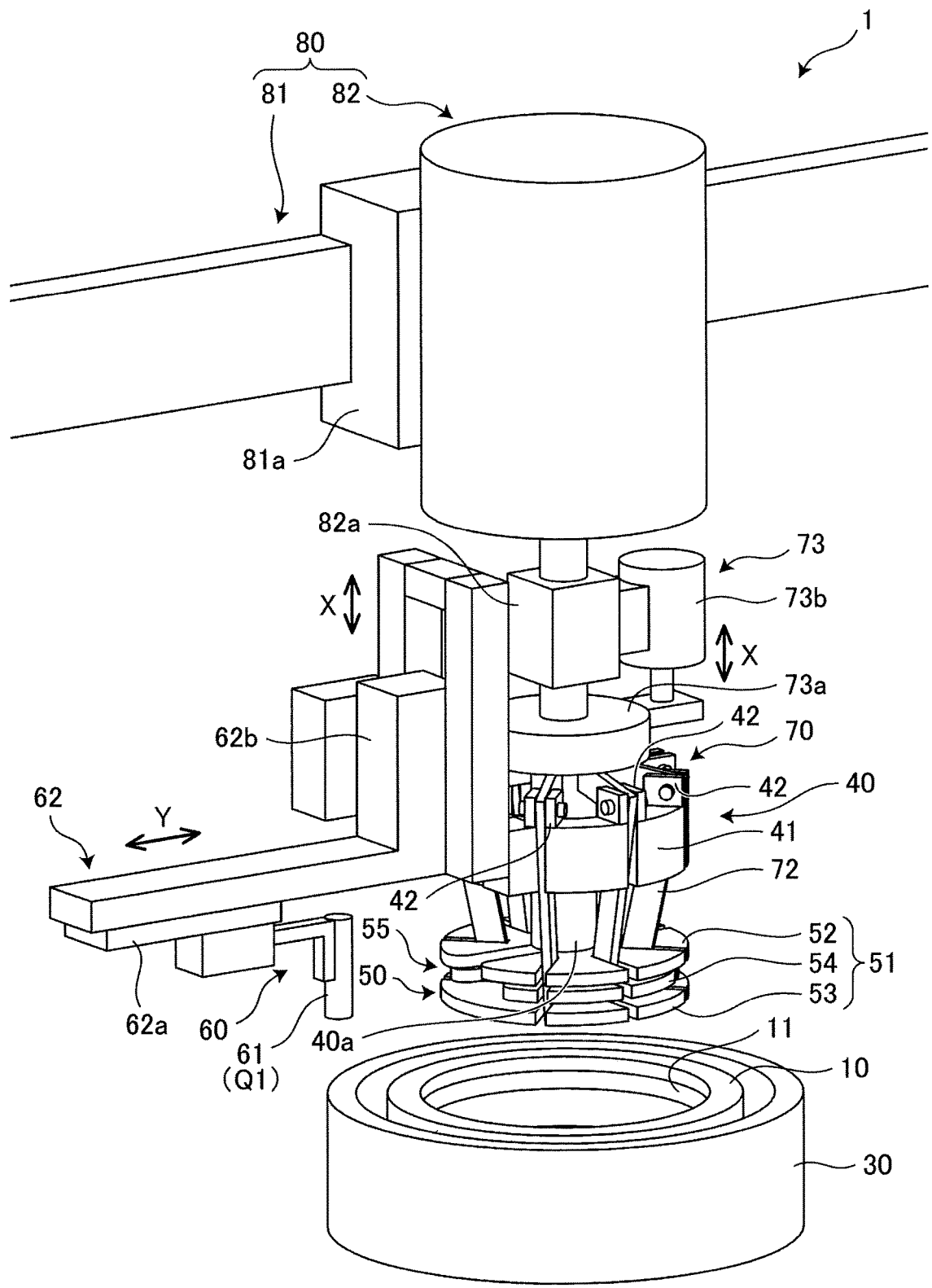
FIG. 3 is a perspective view depicting an operating state of the manufacturing apparatus according to an embodiment of the present invention.

As depicted in FIGS. 2 and 3, a manufacturing apparatus 1 includes a main body holding unit 30 that holds a component main body 10, an attachment unit 40 that attaches the ring-shaped seal body 20 to the channel 11 of the component main body 10, and a moving unit 80 that moves the attachment unit 40. The manufacturing apparatus 1 further includes a loading member 90 on which a ring-shaped seal body 20 is loaded before attachment to the component main body 10.

The main body holding unit 30 holds the component main body 10 to which a seal body 20 is yet to be attached at a predetermined position. Although the manufacturing apparatus 1 is capable of attaching a seal body 20 of a variety of shapes to the component main body 10, an example where a seal body 20 of the following shape is attached is described here.

As depicted in FIGS. 1A and 1C, the ring-shaped seal body 20 is a flexible elastic body (or rubber member) with a seal body inner circumferential surface 20a, a seal body outer circumferential surface 20b, a seal body upper surface (or "one facing surface") 20c and a seal body lower surface (or "another facing surface") 20d.

The seal body inner circumferential surface 20a and the seal body outer circumferential surface 20b are surfaces that are parallel with a center axis Xa (or "restricting direction", described later) of the ring-shaped seal body 20, and the seal body upper surface 20c and the seal body lower surface 20d are surfaces that intersect the center axis Xa (in the present embodiment, surfaces that are perpendicular to the center axis Xa).

The seal body 20 is provided with an inclined surface 20e (produced by cutting away a corner) between the inner circumferential surface 20a and the upper surface 20c and is provided in the same way with an inclined surface 20e (produced by cutting away a corner) between the inner circumferential surface 20a and the lower surface 20d. That is, the seal body 20 is a ring-shaped component whose cross-sectional form is an asymmetric hexagon and which has a smooth outer circumferential portion and an inner circumferential portion that has been chamfered to remove the upper end and lower end on the inner circumferential edges.

The outer circumferential portion of the seal body 20 has the seal body outer circumferential surface 20b that is parallel with an inner circumferential wall (or "third inner wall") 11c (see FIG. 1C) of the attachment channel 11 of the component main body 10. The outer circumferential surface 20b is perpendicular to the seal body upper surface 20c and the seal body lower surface 20d, and is formed so as to be continuous with the seal body upper surface 20c and the seal body lower surface 20d.

As depicted in FIGS. 2 and 3, the moving unit 80 is a device that moves the seal body 20 held by the attachment unit 40 to a predetermined position, and in the present embodiment, moves between the main body holding unit 30 and the loading member 90. The moving unit 80 includes a horizontal moving mechanism 81 that moves the attachment unit 40 in the horizontal direction Y and a raising/lowering mechanism 82 that moves the attachment unit 40 in the raising/lowering direction (i.e., the up-down direction) X. The horizontal moving mechanism 81 moves a horizontal moving body 81a, to which the raising/lowering mechanism 82 is attached in the horizontal direction. The raising/lowering mechanism 82 raises and lowers a raising/lowering moving body 82a to which the attachment unit 40 is attached. Since the horizontal moving mechanism 81 and the raising/lowering mechanism 82 are known moving mechanisms (as examples, a screw driving mechanism, which is equipped with a ball nut and a ball screw, or a belt driving mechanism that causes movement by reciprocally driving a belt), detailed description thereof is omitted here.

Note that the moving unit 80 may move the component main body 10 to which the seal body 20 is to be attached (or the main body holding unit 30 that holds the component main body 10). That is, the moving unit may move at least one of the seal body 20 and the component main body 10 relative to the other. Although two moving mechanisms 81 and 82 that are perpendicular are used as moving mechanisms in the present embodiment, it is also possible to use an articulated moving mechanism with an articulated arm.

As depicted in FIG. 3, the attachment unit 40 is equipped with a support member 40a that is connected to the raising/lowering moving body 82a, an attachment unit main body 41, a ring holding portion 50, a deforming mechanism 60 that causes deformation of the seal body 20, and a ring attaching mechanism 70.

The attachment unit main body 41 is provided in the center of the support member 40a, is a member whose overall external shape is a round cylinder, and is equipped with a plurality of swinging supporting portions 42 that support a plurality of ring attaching members (or "diameter-expanding movement members") 72, described later, so that the ring attaching members 72 are capable of swinging. A biasing member, not illustrated but described later, that applies a biasing force Fa (see FIG. 4) to each ring attaching member 72 inwardly in a radial direction Yr (see FIG. 7) is configured on the attachment unit main body 41, on which an attachment moving mechanism 73, described later, that moves the ring attaching members 72 outward against the biasing force Fa is also installed.

Figure 7:
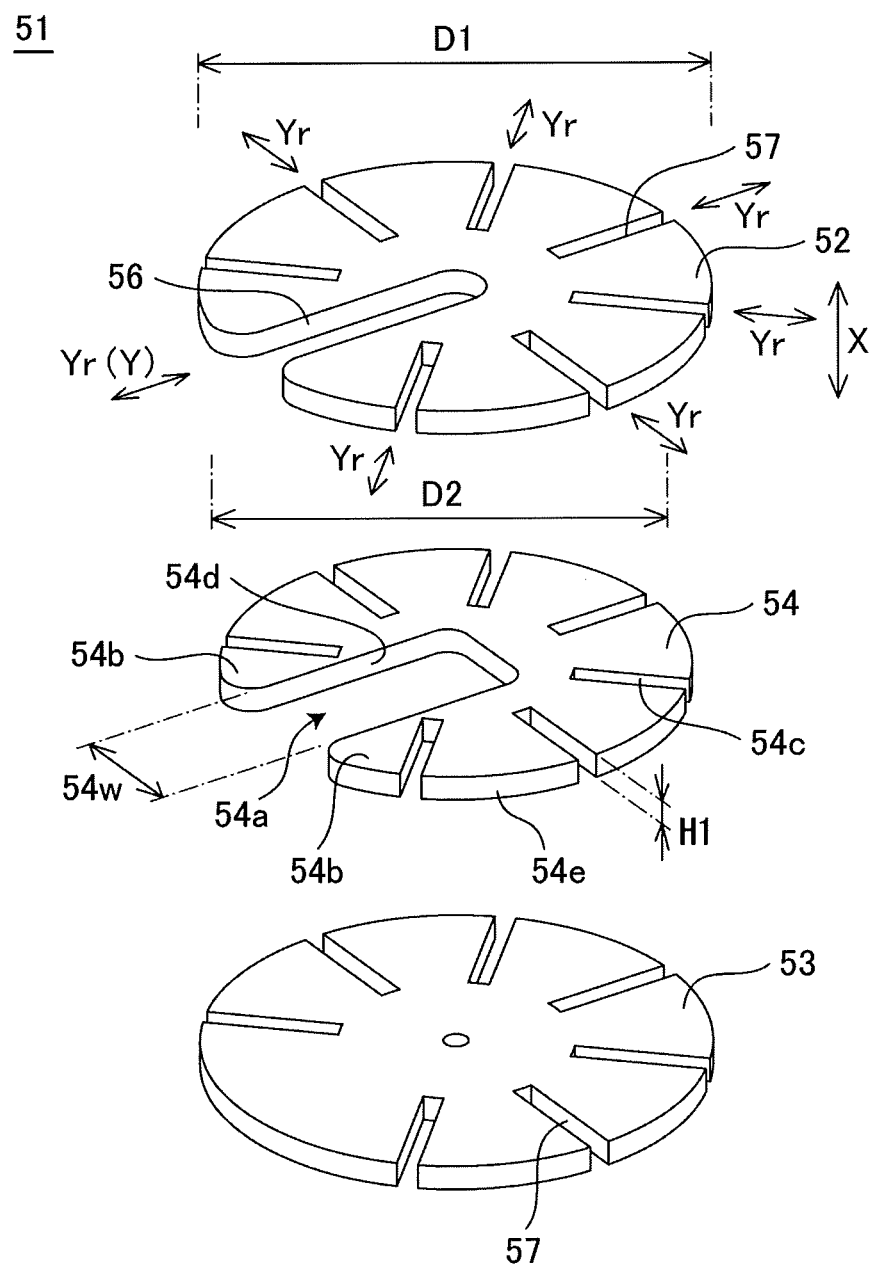
FIG. 7 is an exploded perspective view depicting the construction of a guide portion depicted in FIG. 6A.

As depicted in FIG. 3, the ring holding portion 50 includes a guide portion 51 that is provided at the lower end of the support member 40a and is capable of being inserted inside the inner circumferential portion (or "hollow portion") of the ring-shaped seal body 20. That is, the ring holding portion 50 is provided with the guide portion 51 that has a smaller external diameter than the diameter of the hollow of the ring-shaped seal body 20. As depicted in FIG. 7, the guide portion 51 is equipped with an upper guide plate 52 (or "guide member") and a lower guide plate 53 (or "guide member"), which are disposed in the up-down direction with a gap in between, and an intermediate member 54 disposed between the upper guide plate 52 and the lower guide plate 53.

The upper guide plate 52 and the lower guide plate 53 have overall external shapes that are disc-like and have external diameters that are smaller than the inner diameter of the ring-shaped seal body 20 (see FIG. 6A) before the seal body 20 is subjected to diameter-reducing deformation. This means that it is possible to insert the guide portion 51 inside the ring-shaped seal body 20 before deformation. As depicted in FIG. 7, the intermediate member 54 is disc-shaped with an external diameter D2 that is smaller than the external diameter D1 of the upper guide plate 52 and the lower guide plate 53 and is disposed in a center portion on the inside in the radial direction of (i.e., on the same center axis as) the upper guide plate 52 and the lower guide plate 53. That is, the upper guide plate 52 and the lower guide plate 53 are disposed with a predetermined gap (i.e., the thickness of the intermediate member) H1 between them and are adjacent above and below the intermediate member 54. The gap H1 is set so as to be slightly larger than the thickness (height) dimension Wa (see FIG. 1C) of the seal body 20 so that the seal body 20 can be held between the upper guide plate 52 and the lower guide plate 53.

The upper guide plate 52 and the lower guide plate 53 restrict movement (deformation) in the up-down direction X of the seal body 20 held in the guide portion 51 (see FIG. 8C). In more detail, the upper guide plate (or "upper guide member") 52 restricts the range of movement in one direction (i.e., upward) of the restricting direction Xa of the seal body 20 and the lower guide plate (or "lower guide member") 53 restricts the range of movement in the other direction (i.e., downward) of the restricting direction Xa of the seal body 20. Accordingly, movement (deformation) in the up-down direction X of the seal body 20 held on the guide portion 51 (or the "restricting direction Xa" that intersects the radial direction and circumferential direction of the seal body) is restricted around the entire circumference.

As depicted in FIG. 7, the upper guide plate 52 is equipped with a single first cutaway portion 56 (or "engagement cutaway portion") that extends in the horizontal radial direction Yr from the outer circumferential edge to a center portion. A deformation engagement member 61 (see FIG. 3), described later, of the deforming mechanism 60 is inserted into the first cutaway portion 56 and is capable of moving along the radial direction Yr. The upper guide plate 52 is provided with second cutaway portions 57 that extend in the radial direction Yr (see FIG. 7) from a center side thereof to the outer circumferential edge. A plurality of (seven in the present embodiment) second cutaway portions 57 are formed in the upper guide plate 52. The lengths of the second cutaway portions 57 are adjusted so that the center side ends of the second cutaway portions 57 do not connect to the first cutaway portion 56 and do not interfere with an engagement channel 54a, described later.

As depicted in FIG. 7, the intermediate member 54 is equipped with the single engagement channel 54a that extends in the horizontal radial direction Yr from the outer circumferential portion of the guide portion 51 to a center portion, a pair of engagement portions 54b that are formed on both sides of the opening of the engagement channel 54a, cutaway portions 54c, and an intermediate outer circumferential portion 54e.

The engagement channel 54a is a U-shaped concave portion that is surrounded by an inner wall 54d and is disposed below the first cutaway portion 56 of the upper guide plate 52. Accordingly, as described later, it is possible to move the deformation engagement member 61 inside the engagement channel 54a (see the position in FIG. 4). Also, as described later, the engagement channel 54a is a part (or "housing part") where part of the seal body 20 is pressed into the guide portion 51 (see FIG. 8B). Accordingly, the width 54w of the engagement channel 54a (see FIG. 7) is formed so as to be at least wider than the total of the diameter of the deformation engagement member 61 and double the width of the seal body 20.

The pair of engagement portions 54b are curved parts formed in the opening of the engagement channel 54a and are continuous with the intermediate outer circumferential portion 54e, described later, of the intermediate member 54. The pair of engagement portions 54b are disposed between the upper guide plate 52 and the lower guide plate 53 at a position toward the inside in the radial direction from the outer edge of the upper guide plate 52 and the lower guide plate 53, and are the positions that engage part of the inner circumferential portion of the seal body 20 that has been moved by the deformation engagement member 61. The seal body 20 is reliably deformed into a predetermined shape by moving toward the center of the guide portion 51 (see FIG. 8B) with the corresponding part of the inner circumferential portion of the seal body 20 restricted by the pair of engagement portions 54b and the corresponding part of the outer circumferential portion of the seal body 20 restricted by the deformation engagement member 61 that moves in between the pair of engagement portions 54b.

The cutaway portions 54c extend in the radial direction Yr from the center of the intermediate member 54 toward the outer circumferential edge. A plurality of (seven in the present embodiment) cutaway portions 54c are formed in the intermediate member 54 and outer circumferential edges of the cutaway portions 54c are open. The cutaway portions 54c correspond to the plurality of second cutaway portions 57 of the upper guide plate 52 and are disposed at lower positions that match the positions of the second cutaway portions 57. That is, aside from the position of the engagement channel 54a, the plurality of (seven in the present embodiment) cutaway portions 54c are radially formed at equal intervals and as described later, it is possible to position the ring attaching members 72 inside the cutaway portions 54c.

The intermediate outer circumferential portion 54e is composed of a plurality of curved outer circumferential surfaces that are formed at the outer circumferential portion of the intermediate member 54 and is composed of two surfaces that are continuous with the pair of engagement portions 54b and a plurality of surfaces that are positioned between the plurality of cutaway portions 54c (a total of eight surfaces in the present embodiment). The plurality of outer circumferential surfaces that construct the intermediate outer circumferential portion 54e are positioned on concentric circles. As described later, a part of the inner circumferential portion of the seal body 20 aside from the part of the inner circumferential portion that is deformed by the deformation engagement member 61 in the holding step, or in other words, the part that corresponds to the intermediate outer circumferential portion 54e is engaged by parts corresponding to the intermediate outer circumferential portion 54e. That is, the intermediate outer circumferential portion 54e restricts the positions of the inner circumferential portion of a seal body 20 subjected to deformation that reduces the diameter so that the positions are on concentric circles (see FIG. 8C). Note that although the guide portion 51 described above is produced by assembling the upper guide plate 52, the lower guide plate 53, and the intermediate member 54, the guide portion 51 may be integrally formed as a single member.

As depicted in FIG. 7, in the same way as the upper guide plate 52, the lower guide plate 53 is provided with second cutaway portions 57 that extend in the radial direction Yr from the center of the guide portion 51 toward the outer circumferential portion at a plurality of positions (seven positions in the present embodiment). The plurality of second cutaway portions 57 in the lower guide plate 53 are all open at the outer circumferential edge and are disposed at positions that match and correspond to the plurality of second cutaway portions 57 of the upper guide plate 52. Accordingly, each pair of an upper second cutaway portion 57 and a lower second cutaway portion 57 is constructed so as to pass through the guide portion 51 in the up-down direction X. That is, a guide portion 51 has a plurality of cutaway structures (i.e., pairs of second cutaway portions) for attachment purposes constructed so as to pass through the guide portion 51. Note that the lower guide plate 53 may include a cutaway portion that is the equivalent of the first cutaway portion 56 of the upper guide plate 52 at a position that corresponds to the first cutaway portion 56.

As depicted in FIG. 3, the deforming mechanism 60 includes a deformation engagement member 61 that acts in concert with the ring holding portion 50 to hold the seal body 20. The deformation engagement member 61 is a rod-shaped member with a shaft that extends in a direction parallel to the center axis direction Xa of the seal body 20 (see FIG. 1) and is capable of moving in the horizontal direction (radial direction) Y and the up-down direction (restricting direction) X. Note that the deformation engagement member 61 in the present embodiment is a rod-shaped member that is circular in cross section. The deformation engagement member 61 is capable of moving inside the first cutaway portion 56 of the upper guide plate 52 (and the engagement channel 54a of the intermediate member 54). Accordingly, as depicted in FIG. 8A, the ring holding portion 50 is moved to a position of the inner circumferential portion of the seal body 20 that has been loaded onto the loading member 90 and the deformation engagement member 61 is moved from the outside of the seal body 20 toward the inside in the radial direction, so that the deformation engagement member 61 comes into contact with a corresponding part of the outer circumferential portion of the seal body 20. The deformation engagement member 61 is then moved further inward in the radial direction Ya, the seal body 20 that is contacted by the deformation engagement member 61 (i.e., the contacted portion of the seal body 20) is moved inside the engagement channel 54a (see FIG. 7) of the intermediate member 54, parts of the inner circumferential portion of the seal body 20 that correspond to the engagement portions 54b are restricted by the pair of engagement portions 54b, and other parts of the inner circumferential portion of the (deformed) seal body 20 contact and are restricted by the intermediate outer circumferential portion 54e, thereby producing a state where the seal body 20 is held by the ring holding portion 50 (see FIG. 8B). In this way, out of the guide portion 51, a structure composed of one surface 52a out of the facing surfaces of the pair of guide plates 52 and 53, the other facing surface 53a, and the engagement portions 54b that engage the engaged portion of the seal body 20 can be referred to as a "support portion 55" for the seal body 20 (see FIG. 8A).

Figure 10:
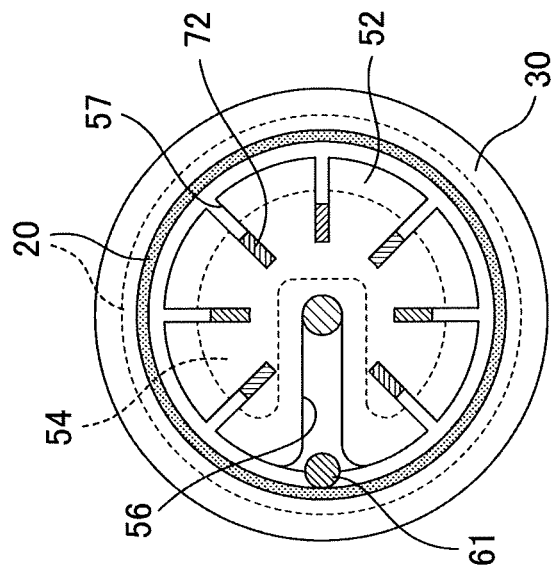
FIGS. 10A and 10B are diagrams useful in explaining the operation of a manufacturing apparatus and a method of manufacturing an assembled product.
Figure 10:
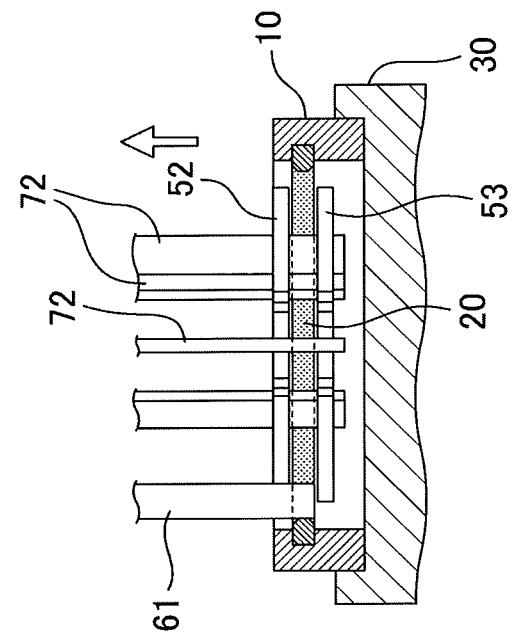
Figure 10:
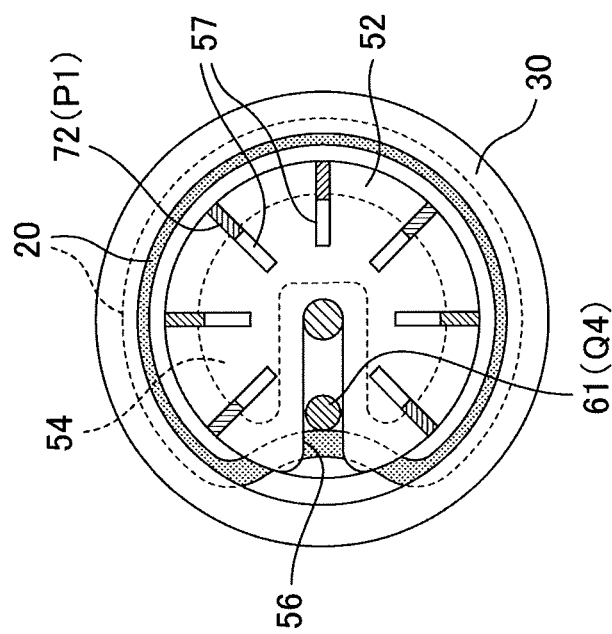
Figure 10:
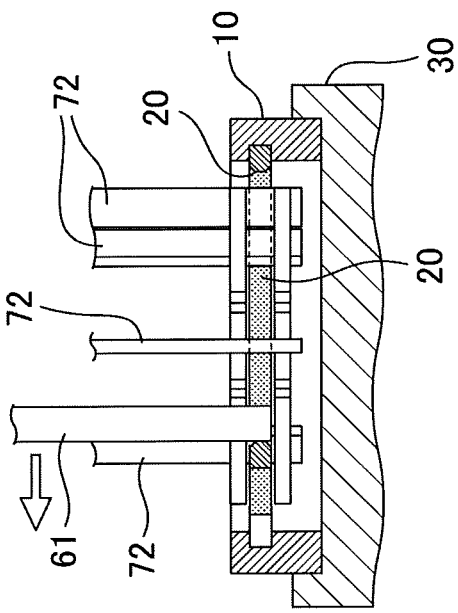
Figure 11:
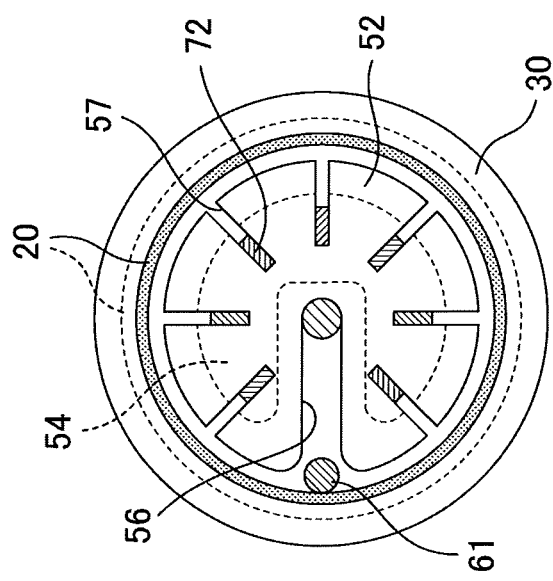
FIGS. 11A and 11B are diagrams useful in explaining the operation of a manufacturing apparatus and a method of manufacturing an assembled product.
Figure 11:
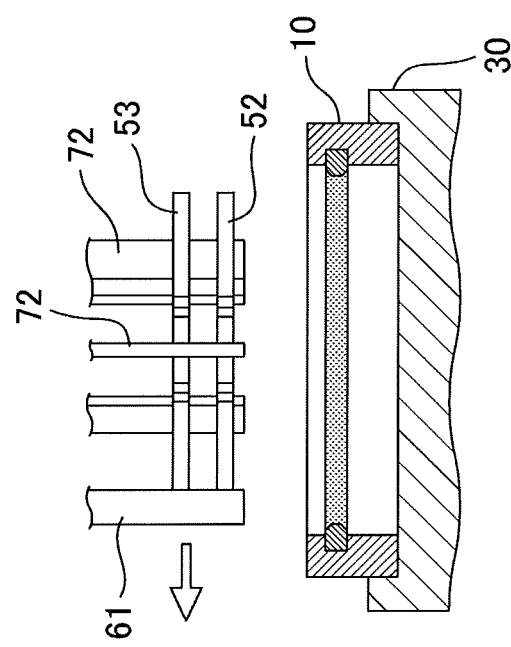
Figure 11:
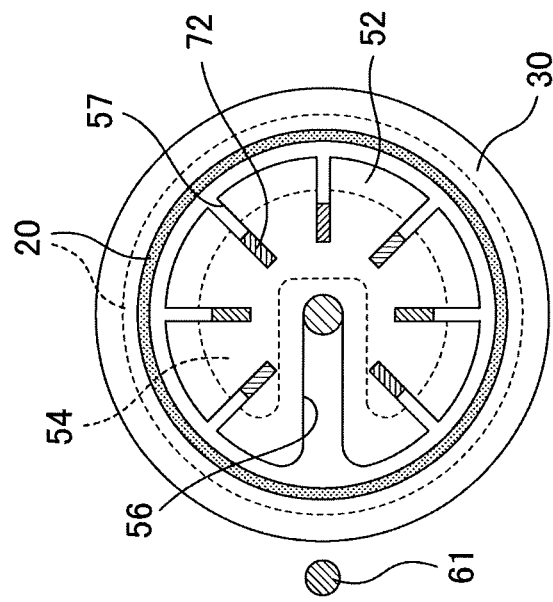
Figure 11:
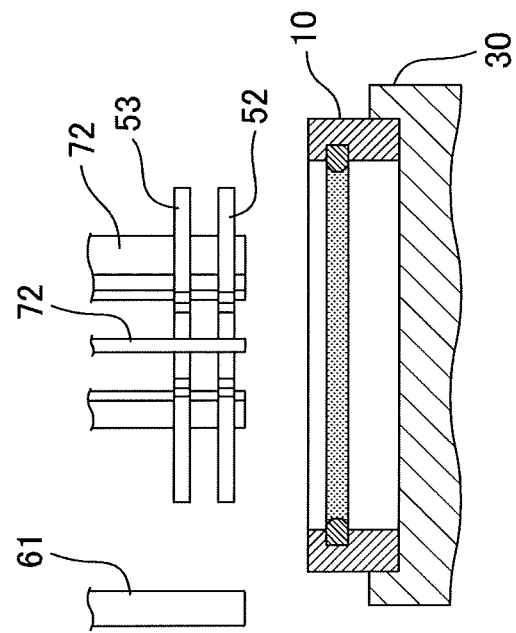

A deformation moving mechanism 62 moves the deformation engagement member (or "pressing member") 61 and, as depicted in FIG. 3, is attached to a main body 41 of the attachment unit 40. The deformation moving mechanism 62 is equipped with a horizontal moving mechanism (or "first deformation moving mechanism") 62a that causes movement in the horizontal direction Y and a vertical moving mechanism (or "second deformation moving mechanism") 62b that causes movement in the up-down direction X. The horizontal moving mechanism 62a moves the deformation engagement member 61 reciprocally in the radial direction (or "first movement direction") Y between an outer standby position Q1 (see the positions in FIG. 3 and FIG. 8A) set on the outer circumference side of the ring holding unit 50 and a holding position Q1 (see the positions in FIG. 4 and FIG. 8B) set on the inner circumference side of the ring holding portion 50 (a position that is further inside than the outer standby position Q1 in the radial direction). The vertical moving mechanism 62b moves the deformation engagement member 61 reciprocally in the up-down direction X (or "second movement direction" that is the vertical direction which intersects the (horizontal) radial direction) between an upper standby position Q3 (see the positions indicated by a solid line in FIG. 5 and FIG. 9C) that is set above the ring holding unit 50 and a pressing readiness position Q4 (see the positions indicated by a dot-dot-dash line in FIG. 5 and FIG. 10A). Note that since it is possible to use a variety of known mechanisms as the horizontal moving mechanism 62a and the vertical moving mechanism 62b, detailed description thereof is omitted here.

The ring attaching mechanism 70 (see FIG. 3) engages the inner circumferential edge 20a of the seal body 20 supported on the ring holding portion 50 and moves the seal body 20 to the attachment channel 11 of the component main body 10. The ring attaching mechanism 70 is equipped with a plurality of ring attaching members 72 (see FIG. 8A) that engage the inner circumferential surface 20a of the seal body 20, biasing members (not illustrated) that apply a biasing force Fa (see FIG. 4) inwardly in the radial direction to the ring attaching members (or "diameter-expanding movement members") 72, and an attachment moving mechanism 73.

Figure 4:
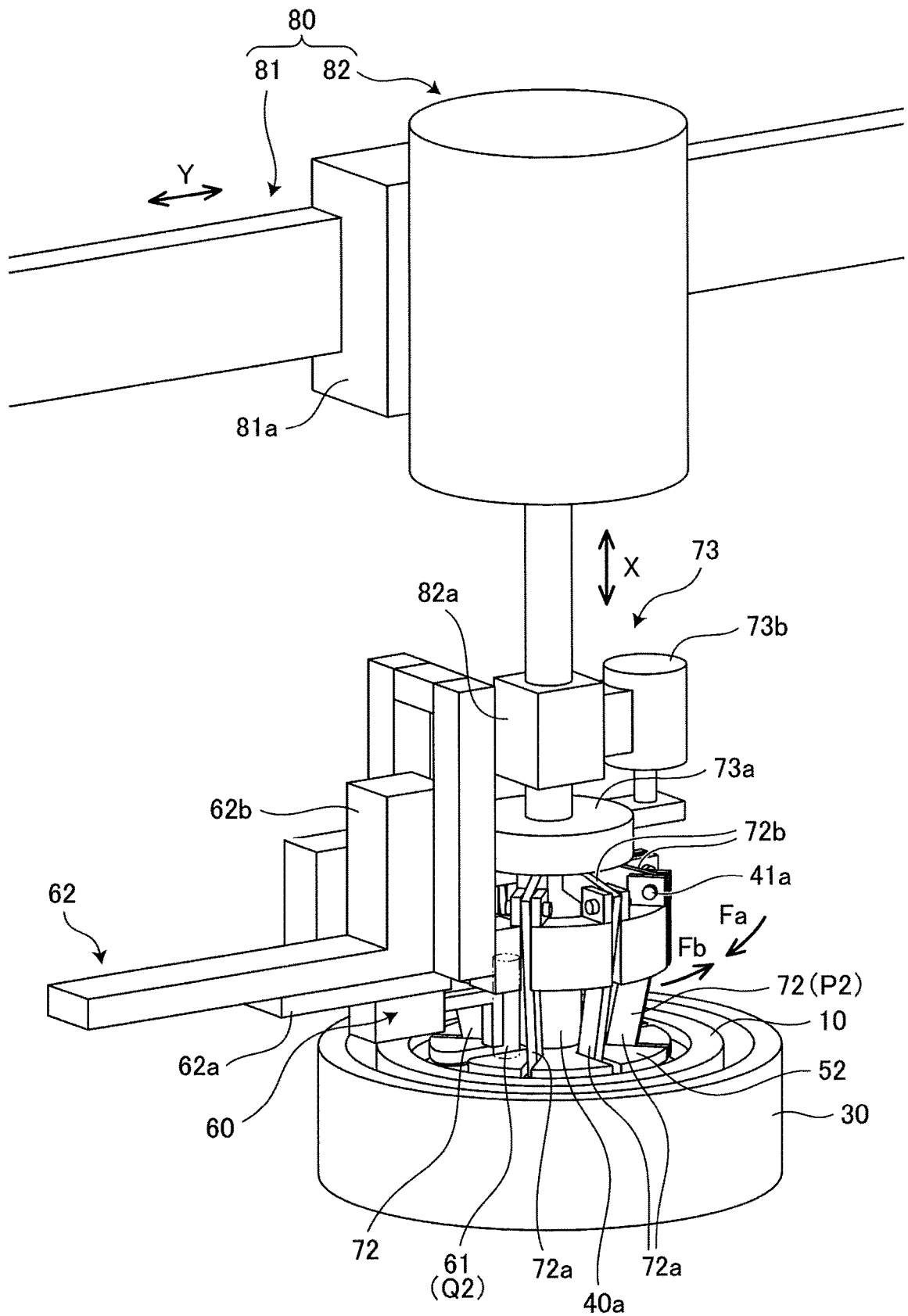
FIG. 4 is a perspective view depicting an operating state of the manufacturing apparatus according to an embodiment of the present invention.

Each ring attaching member 72 is a plate-like rod member that is bent into an L shape and as depicted in FIG. 4, is disposed so as to be inserted through the second cutaway portions 57 and a cutaway portion 54c of the guide portion 51. Each ring attaching member 72 is provided with a lower end portion (or "other end portion" or "moving end portion") 72a that extends in the up-down direction and an upper end portion (or "first end portion") 72b that extends in the horizontal direction. The bent portion between the lower end portion 72a and the upper end portion 72b of each ring attaching member 72 is supported so as to be capable of swinging on a swinging supporting portion 42 of the attachment unit main body 41. The lower end portions 72a of the ring attaching members 72 are inserted through the second cutaway portions 57 and the cutaway portions 54c of the guide portion 51, but the upper end portions 72b of the ring attaching members 72 are not connected to anything and are therefore free. The biasing members (not illustrated) are disposed inside the attachment unit main body 41 and apply an inward biasing force Fa in the radial direction on the respective ring attaching members 72. Note that the biasing members are known springs (or "elastic bodies") and for this reason detailed description and illustration are omitted here.

As depicted in FIG. 4, the attachment moving mechanism 73 includes a ring-shaped raising/lowering portion 73a provided so as to be freely slidable on the cylindrical support member 40a. The attachment moving mechanism 73 is provided with the support member 40a inserted through a hole in the center of the raising/lowering portion 73a, and has a raising/lowering actuator 73b, which is supported on the support member 40a, connected to the raising/lowering portion 73a. When the raising/lowering portion 73a is moved downward along the support member 40a by the raising/lowering actuator 73b, a lower surface of the raising/lowering portion 73a comes into contact with the upper end portions 72b of the ring attaching members 72, so that due to the lever principle, an attachment force Fb acts in the opposite direction to the direction of the biasing force Fa on the lower end portions 72a of the respective ring attaching members 72. As a result, the lower end portions 72a of the ring attaching members 72 spread out in the radial direction, producing the state at the attachment position P1 (or "outer position", see the position in FIG. 5). When the raising/lowering portion 73a is moved upward by the raising/lowering actuator 73b, the pressing on the upper end portions 72b of the ring attaching members 72 by the raising/lowering portion 73a is released. As a result, the lower end portions 72a of the ring attaching members 72 close up inwardly in the radial direction due to the biasing force Fa of the biasing members, producing the state at a movement standby position P2 (or "inner position", see the position in FIG. 4). That is, when the raising/lowering portion 73a of the attachment moving mechanism 73 is raised or lowered, the ring attaching members 72 move reciprocally in the radial direction Yr along the second cutaway portions 57 between the movement standby position P2 and the attachment position P1. As one example, the movement standby position P2 is a position where the ring holding portion 50 is holding the seal body 20 (a state where the lower end portions 72a of the ring attaching members 72 have moved close together) (see FIG. 3). The attachment position P1 is a position where the seal body 20 supported by the ring holding portion 50 is attached to the component main body 10 (a state where the lower end portions 72a of the ring attaching members 72 have spread out) (see FIG. 5). Note that it is possible to use a variety of known mechanisms as the attachment moving mechanism.

In the present embodiment, although a configuration where the second cutaway portions 57 are provided in both the upper guide plate 52 and the lower guide plate 53 has been described as an example, the present invention is not limited to this. As one example, the second cutaway portions 57 may be formed in only the upper guide plate 52. As one example, when the lower end portions 72a of the ring attaching members 72 that are axially supported as described earlier so as to be capable of swinging are moved along the second cutaway portions 57, the lower end portions 72a will move on curved paths that are centered on (horizontally extending) swinging shafts 41a (see FIG. 5) of the swinging supporting portions 42 of the attachment unit main body 41 for the ring attaching members 72. For this reason, a configuration where the second cutaway portions 57 are formed in both the upper guide plate 52 and the lower guide plate 53 is preferable. Also, when a mechanism that slides the ring attaching members 72 in the second cutaway portions 57 and the front ends of the ring attaching members 72 in a straight line across the upper surface 53a of the lower guide plate 53 is used, it is possible to use a configuration where the second cutaway portions 57 are provided in only the upper guide plate 52, which is preferable by having a simple structure.

In this way, by moving the ring attaching members 72 along the cutaway portions 57 and 54c using the attachment moving mechanism 73, the attachment unit 40 attaches the seal body 20 to the channel 11 of the component main body 10.

In the manufacturing apparatus 1 according to the present embodiment, when attaching the seal body, since the seal body 20 is attached to the component main body by operating the plurality of ring attaching members 72 that are radially disposed so as to move from the state at the movement standby position P2 (see FIG. 4) to the state at the attachment position P1 (see FIG. 5), it is possible to attach the seal body 20 inside the attachment channel 11 of the component main body 10 while applying forces to parts of the inner circumferential portion of the ring-shaped seal body 20 that respectively correspond to the ring attaching members 72. In this way, by using the plurality of ring attaching members 72, it is possible to apply distributed forces instead of applying a force that pushes out a single part of the inner circumferential portion of the ring-shaped seal body 20, which means that it is possible to reliably and smoothly attach the seal body 20 to the component main body 10.

Figure 6:
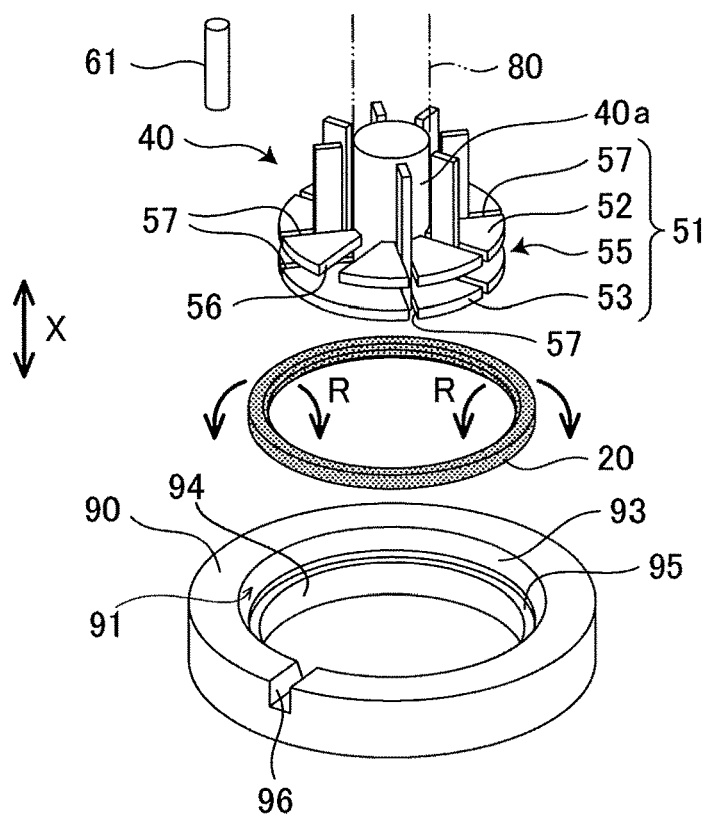
FIG. 6A is a perspective view of a loading member, a seal body to be transported to the loading member, and a principal part of an attachment unit that holds a seal body.
FIG. 6B is a perspective view depicting a state where the seal body has been transported to the loading member.
FIG. 6C is a perspective view depicting a B-B section in FIG. 6B.
Figure 6:
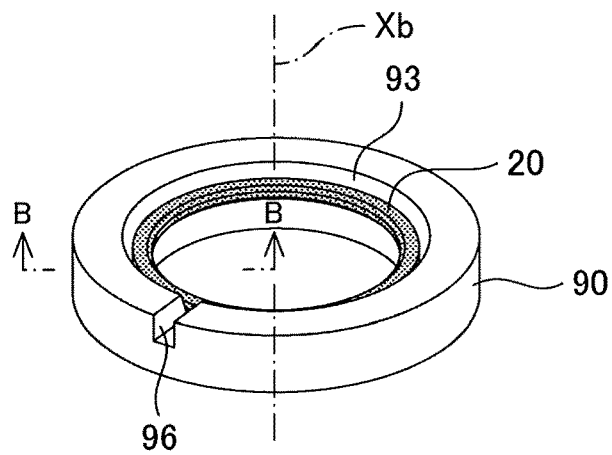
Figure 6:
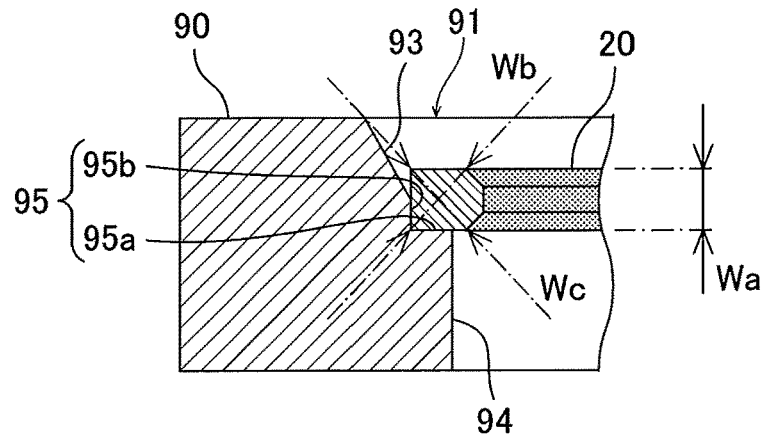

The loading member 90 (see FIGS. 6A and 6C) is a member on which a seal body 20 is prepared and placed before being held by the ring holding portion 50, and is provided with an opening 91 that widens toward the top, a ring-shaped inclined portion (or "large diameter concave portion") 93 that guides the outer circumferential surface of the seal body 20 toward a loading portion 95, described later, and the loading portion 95 that is provided at the other end of the inclined portion 93 and on which a seal body 20 is loaded. As depicted in FIG. 6C, the loading portion 95 is provided with a loading surface 95a on which a seal body 20 before attachment is loaded and an outer circumferential wall 95b that restricts movement of the outer circumferential surface of the seal body 20 on a plane that is parallel to the loading surface 95a. The outer circumferential wall 95b and the inclined portion 93 are provided so as to be continuous. In the loading surface 95a, a reduced diameter portion 94 with an opening that is larger than the inner diameter than the seal body 20 but smaller than the external diameter of the seal body 20 is formed. The reduced diameter portion 94 has a depth that is capable of housing part of the ring holding unit 50 of the attachment unit 40 when the seal body 20 is held (i.e., picked up) by the ring holding portion 50. The outer circumferential wall 95b and the reduced diameter portion 94 are concentrically disposed. The reduced diameter portion 94 is disposed at a position that is separated from the opening 91 and is disposed so that a center axis of the reduced diameter portion 94 and a center axis of the opening 91 are the same axis Xb (see FIG. 6B). The loading member 90 is additionally provided with a connecting channel 96 formed at a position that corresponds to a movement path of the deformation engagement member 61.

Figure 5:
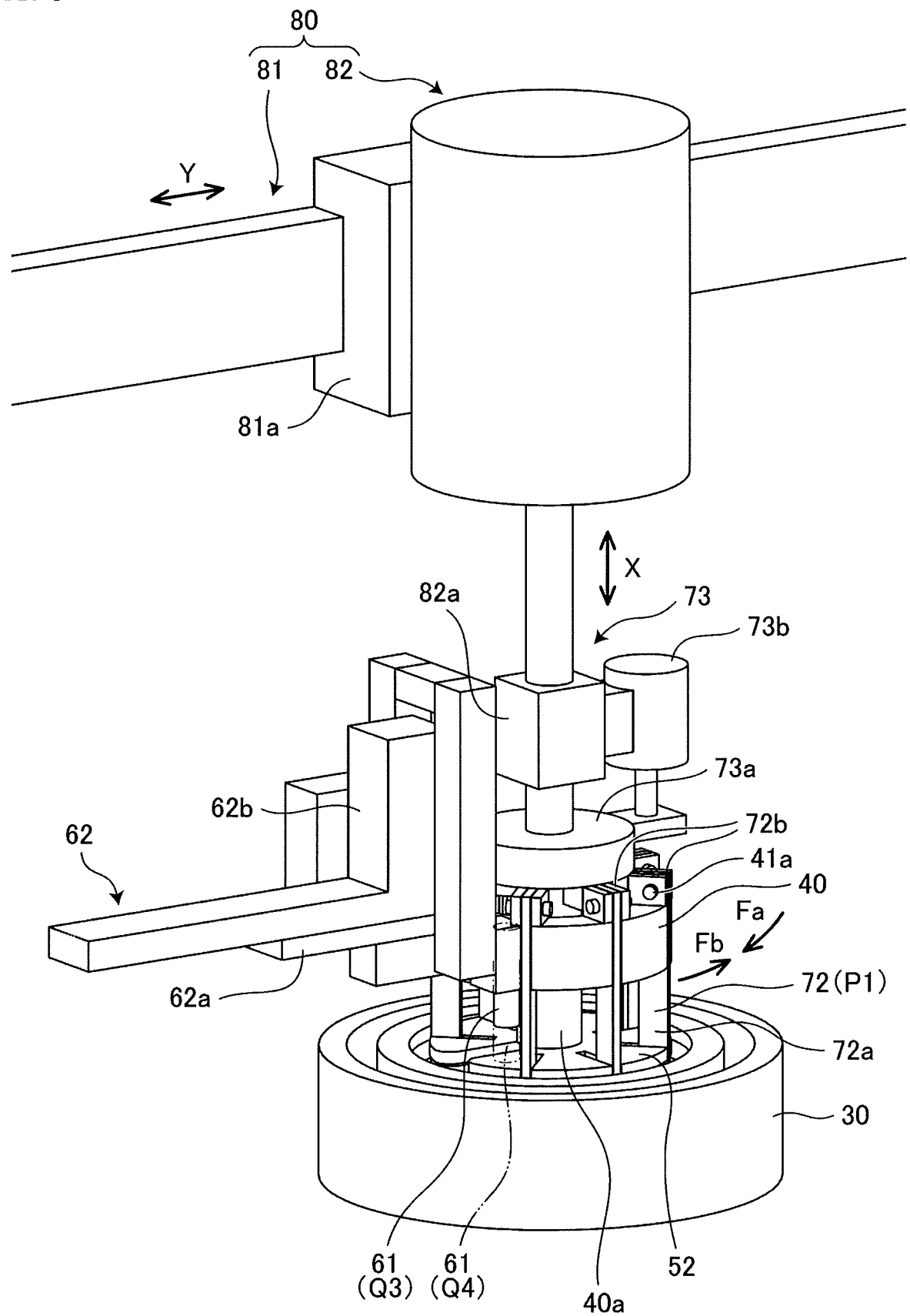
FIG. 5 is a perspective view depicting an operating state of the manufacturing apparatus according to an embodiment of the present invention.

Next, a method of manufacturing an assembled product (a method of manufacturing a ring-member attached product) according to the present embodiment will be described with reference to FIGS. 8 to 11 (FIG. 8A to FIG. 11B). Here, the method of manufacturing will be described while describing the operation of the manufacturing apparatus 1 described earlier. Note that FIGS. 8A to 11B are schematic diagrams in which plan views and front views depicting the configuration to be described are arranged in the up-down direction. Also, as depicted in FIG. 3 to FIG. 5, although the ring attaching members 72 of the manufacturing apparatus 1 according to the present embodiment are each supported so as to be capable of swinging on a swinging supporting portion 42 and the lower end portion of each ring attaching member 72 moves so as to trace a curved path, in the diagrams in FIGS. 8A to 11B, for the sake of convenience, the ring attaching members 72 at every position are depicted in a state (horizontal movement state) where the ring attaching members 72 extend vertically.

Figure 12:
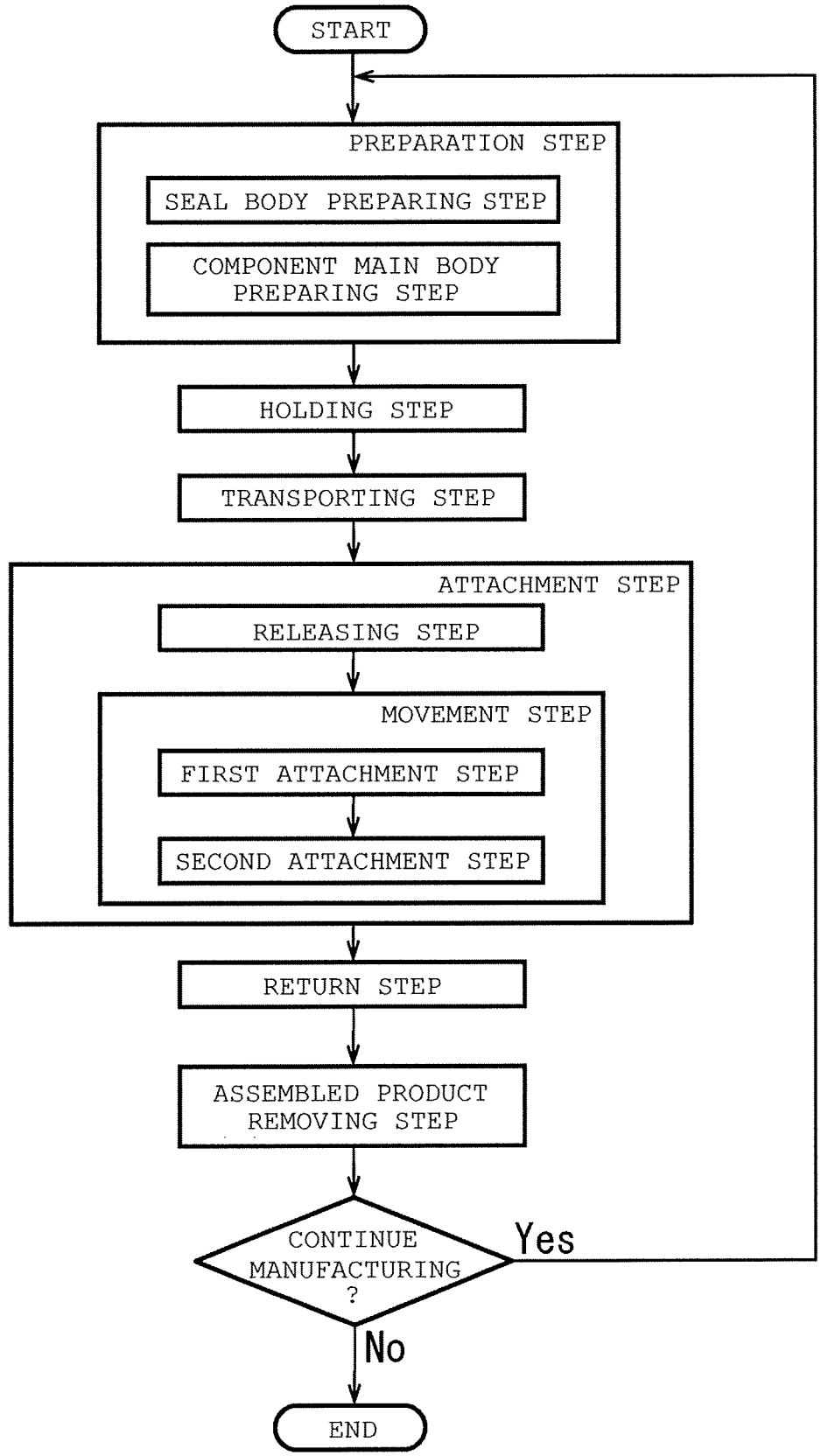
FIG. 12 is a flowchart depicting a method of manufacturing an assembled product according to the present invention.

The method of manufacturing the assembled product P (see FIG. 1A) according to the present embodiment is a method that attaches the ring-shaped seal body 20 to the ring-shaped attachment channel 11 formed in the inner circumferential surface of the ring-shaped component main body 10. As depicted in FIG. 12, the method of manufacturing includes, as a preparation step of the assembled product P, a seal body preparing step that prepares the seal body 20 and a component main body preparing step that prepares the component main body 10. After this, as following steps, a holding step that holds the prepared seal body 20, a transporting step, and an attachment step of attaching the held seal body 20 to the component main body 10 are included. In addition, a subsequent return step is included. Note that it is preferable for the seal body preparing step and the component main body preparing step to be performed as necessary.

In the seal body preparing step, the seal body 20 to be attached is transported by a transporting mechanism, not illustrated, to the loading portion 95 of the loading member 90 that is installed at a predetermined position (see FIG. 6B). The seal body 20 that has been transported to the loading portion 95 of the loading member 90 is loaded in a state that has been corrected by the loading portion 95 to a perfect circle without parts of the seal body 20 becoming stretched or compressed. This state is preferable as the state prior to holding by the ring holding portion 50. In the component main body preparing step, the component main body 10 before the seal body 20 is attached is disposed at the attachment position of the main body holding unit 30 (see FIG. 8C). Note that either of the seal body preparing step and the component main body preparing step may be performed first, the two steps may be performed simultaneously, and it is sufficient for the preparing steps to be completed before the attachment step.

The holding step is performed after the seal body preparing step (see FIGS. 8A to 8C). The holding step first moves the ring holding portion 50 to the inner circumferential portion of the seal body 20 prepared on the loading member 90 (see FIG. 8A). In more detail, the ring holding portion 50 is moved so that the height position (the position in the up-down direction X) of the upper surface 53a of the lower guide plate 53 of the ring holding portion 50 becomes the same position as the loading surface 95a of the loading portion 95 of the loading member 90. At this time, the deformation engagement member 61 is positioned at the outer standby position Q1 that is to the outside of the outer edge of the seal body 20. Also, the plurality of ring attaching members 72 are positioned at the movement standby position P2 that is further inside than the inner edge of the seal body 20. Next, the deformation engagement member 61 is moved inward in the radial direction Ya from the outer standby position Q1. As a result, the deformation engagement member 61 passes through the connecting channel 96 and comes into contact with part (i.e., the "engaged portion") 21 of the outer circumferential portion of the seal body 20. When the deformation engagement member 61 is moved further inward in the radial direction Ya, the corresponding contacted portion (or "engaged portion") 21 of the seal body 20 that is contacted by the deformation engagement member 61 becomes pressed in between the upper guide plate 52 and the lower guide plate 53 (see FIG. 8B). In addition, out of the seal body 20, the engaged portion 21 that is contacted by the deformation engagement member 61 is pressed inside the engagement channel 54a of the intermediate member 54 of the guide portion 51 by the inward movement of the deformation engagement member 61.

Between the upper guide plate 52 and the lower guide plate 53, the lower surface 20d of the seal body 20 is placed in a state that is adjacent to the upper surface (facing surface) 53a of the lower guide plate 53 and the upper surface 20c of the seal body 20 is placed in a state that is adjacent to the lower surface 52a of the upper guide plate 52. When the entire seal body 20 becomes positioned between the upper guide plate 52 and the lower guide plate 53 and inside the engagement channel 54a, the seal body 20 is deformed to a state where the outer diameter (of a circumscribed circle) of the seal body 20 is smaller than the outer circumferential diameter of the upper guide plate 52 and the lower guide plate 53. When this state is reached, deformation (movement) of the entire seal body 20 in the up-down direction is restricted by the upper guide plate 52 and the lower guide plate 53. That is, the upper guide plate 52 and the lower guide plate 53 are capable of restricting deformation (movement) in the up-down direction X (a restricting direction that is parallel to the outer circumferential surface of the intermediate member 54) of the seal body 20 that has moved to the space between the upper guide plate 52 and the lower guide plate 53. In this state, rotation R (see FIG. 1A) that causes the inner circumferential side and outer circumferential side of the ring-shaped seal body 20 to become interchanged (or "inverted") is also restricted. That is, rotation (inversion) that rotates around a circumferential axis C (see FIG. 1C) that extends in the circumferential direction of the ring-shaped seal body 20 is prevented. To make this restriction more reliable, it is preferable for the gap H1 (see FIG. 8C) between the upper guide plate 52 and the lower guide plate 53 to be greater than the thickness dimension Wa (see FIG. 6C) of the seal body 20 and also shorter than the diagonal dimensions Wb and Wc of a cross section of the seal body 20. By setting the dimension in this way, it is possible to more reliably prevent twisting and inverting of the seal body 20 between the upper guide plate 52 and the lower guide plate 53.

The deformation engagement member 61 moves to a holding position Q2 (see FIG. 8B). At this time, the deformation engagement member 61 comes into contact with the outer circumferential portion (or "outer circumferential side") of the contacted portion (or "engaged portion") 21 of the seal body 20 and the ring attaching members 72 are positioned on the inner circumferential portion (or "inner circumferential side": closer to the center than the intermediate outer circumferential portion 54e) of the seal body 20. The contacted portion (or "engaged portion") 21 of the seal body 20 that is contacted by the deformation engagement member 61 is moved by the deformation engagement member 61 that has moved to the holding position Q2 further inward in the radial direction than the outer end portions of the ring attaching members 72 (that contact the seal body 20) (see FIG. 8B). At this time, part of the outer circumferential portion of the seal body 20 becomes engaged by the pair of engagement portions 54b of the intermediate member 54. When the deformation engagement member 61 is moved further toward the center, part of the inner circumferential portion of the seal body 20 is moved (pulled) inside the engagement channel 54a while being guided by the pair of engagement portions 54b. As a result, the seal body 20 deforms (so that its diameter reduces) and at parts of the seal body 20 aside from the engaged portion 21 and a part that has moved inside the engagement channel 54a (i.e., at parts of the seal body 20 corresponding to the intermediate outer circumferential portion 54e of the intermediate member 54), the inner circumferential surface of the seal body 20 contacts the outer circumferential surfaces (or "intermediate outer circumferential portion") 54e of the intermediate member 54. This means that inward movement of the inner circumferential portion of the seal body 20 is restricted by the outer circumferential surfaces of the intermediate member 54. When the inner circumferential portion of the seal body 20 contacts the plurality of curved intermediate outer circumferential portions 54e that are disposed on a circle surrounding the intermediate member 54, the seal body 20 deforms so that the diameter becomes smaller than the pre-deformation state, thereby completing the diameter-shrinking deformation.

As a result, the seal body 20 is held in the deformed state by the upper guide plate 52 and the lower guide plate 53, the deformation engagement member 61, and the intermediate member 54. That is, the seal body 20 is held in a deformed state by the ring holding portion 50. Further deformation and movement of the seal body 20 in this state are restricted, so that the seal body 20 is securely held.

After the seal body 20 has been held, a transporting step is performed (see FIG. 8C and FIG. 9A). The transporting step is a step where the ring holding portion 50 (the attachment unit 40) that holds the seal body 20 is moved to the position of the inner circumferential portion (or "hollow portion") of the component main body 10.

After the transporting step is complete, the attachment step is performed next. The attachment step is a step that attaches the held seal body 20 to the attachment channel 11 of the component main body 10 and includes a releasing step and a movement step.

In the releasing step, the deformation engagement member 61 is first moved from the holding position Q2 outwardly in the radial direction (see FIG. 9A) and after this, the deformation engagement member 61 is moved upward (see FIG. 9B) and then finally moved to the upper standby position Q3 that is above the holding position Q2 (see FIG. 9C). Note that when the releasing step is performed rapidly, the deformation engagement member 61 may be moved from the holding position Q2 directly to the upper standby position Q3. By doing so, the pressing force (engaging force) of the deformation engagement member 61 on the seal body 20 held in the deformed state in the holding step is released, thereby releasing the held state of the seal body 20. Even after the pressing force of the deformation engagement member 61 has been released to release the held state, the seal body 20 is still positioned between the upper guide plate 52 and the lower guide plate 53 of the ring holding portion 50. That is, after the releasing of the held state the seal body 20 is supported by the ring holding portion 50.

After this releasing step, the movement step is performed (see FIG. 10A and FIG. 10B). The movement step includes a first attachment step and a second attachment step where the seal body 20 that was being held in a deformed state is attached to the component main body 10. In this movement step, the seal body 20 is corrected into a ring shape and is attached to the attachment channel 11 of the component main body 10 (see FIG. 1A).

The first attachment step is a step where the plurality of ring attaching members 72 at the movement standby position P2 disposed on the inside (inner circumferential edge) 20a of the seal body 20 supported in the deformed state are moved from the movement standby position P2 (see FIG. 8C) finally to the attachment position P1 (see FIG. 10A) that is on the outside in the radial direction. Due to this operation, the entire seal body 20 is pressed outward and moves so as to become attached to the channel 11 of the component main body 10.

In the second attachment step, first the deformation engagement member 61 at the upper standby position Q3 (see FIG. 9C) is moved to the pressing readiness position Q4 that is inside the engaged portion 21 of the seal body 20 (see FIG. 10A). After this, the deformation engagement member 61 is moved from the pressing readiness position Q4 toward the outside in the radial direction (see FIG. 10B). By performing this operation, the deformation engagement member 61 moves part of the deformed seal body 20 into the attachment channel 11 of the component main body 10 to attach that part of the seal body 20 to the attachment channel 11.

In the first attachment step, when the plurality of ring attaching members 72 that are radially disposed are moved from the movement standby position P2 to the attachment position P1 to attach the seal body 20 to the component main body 10, the plurality of ring attaching members 72 apply a force to corresponding parts of the inner circumferential portion of the ring-shaped seal body 20 to substantially attach the seal body 20 to the component main body 10. After this, by performing the second attachment step, the part of the seal body 20 that was deformed is attached to the component main body 10 by the deformation engagement member 61. As a result, it is possible for the ring attaching members 72 and the deformation engagement member 61 to apply a uniform force at predetermined intervals to the inner edge in the circumferential direction of the seal body 20, which means that it is possible to manufacture the assembled product P to which the seal body 20 has been attached uniformly with no gaps to the attachment channel 11 on the inner circumferential surface of the component main body 10.

When attachment of a seal body 20 is to be repeated after the attachment step ends, a return step is performed. In the return step, the ring attaching members 72 are moved from the attachment position P1 to the movement standby position P2 and the entire attachment unit 40 is moved upward (see FIG. 11A). After this, the deformation engagement member 61 is moved to the outer standby position Q1 (see FIG. 11B). The manufactured assembled product P is then removed from the main body holding unit 30 by a transferring device, not illustrated (assembled product removing step).

When attachment of a seal body 20 is to be performed again, the seal body preparing step is performed to convey a seal body 20 to the loading member 90 and the attachment unit 40 in the initial state (the state depicted in FIG. 11B) is moved to an initial position that is above the loading member 90 (see FIG. 8A). The component main body preparing step is also performed by the main body holding unit 30 so that a new component main body 10 is loaded onto the main body holding unit 30. After this, the attachment unit 40 is again moved to the holding position where the seal body 20 on the loading member 90 is held and the operations described earlier are repeated.

The manufacturing apparatus and method of manufacturing according to the present embodiment are especially effective when attaching the seal body 20, which is provided with a pair of facing surfaces, one of which (here, the upper surface 20c) faces one inner wall (the upper inner wall) 11a out of the pair of inner walls 11a and 11b of the attachment channel 11 and the other of which (here, the lower surface 20d) that faces the other inner wall (the lower inner wall) 11b, to the ring-shaped attachment channel 11 that is formed in the inner circumferential portion of the component main body 10. A state where the two facing surfaces 20c and 20d of the seal body 20 face the inner walls 11a and 11b of the attachment channel, is for example a configuration where the gap H1 (see FIG. 7) between the upper guide plate 52 and the lower guide plate 53 is greater than the thickness dimension Wa (see FIG. 1C) of the seal body 20 but shorter than the diagonal dimension Wb and Wc of a cross section of the seal body 20. With this configuration, when the holding step and the attachment step are performed, it is possible to move the seal body 20 in the radial direction while restricting one facing surface (the upper surface 20c) of the seal body 20 and the other facing surface (the lower surface 20d), so that twisting and inverting (i.e., turning inside out) of the seal body 20 between the upper guide plate 52 and the lower guide plate 53 are reliably prevented.

When attaching the seal body 20, which includes an inner circumferential portion that tapers toward the inner circumferential edge, to the attachment channel 11, the inner circumferential side surface pressed by the ring attaching members 72 and the deformation engagement member 61 is smaller than the outer circumferential side surface, which makes it easy for the inner circumferential side and the outer circumferential side of the seal body 20 to become inverted. The manufacturing apparatus and method of manufacturing according to the present embodiment reliably prevent such inverting of the seal body 20 and are capable of reliably attaching the seal body 20 to the attachment channel 11 of the component main body 10 while keeping the orientation of the seal body 20 in a desired state (that is, a state where the outer circumferential portion of the seal body 20 faces the outside). Note that the present invention may also be implemented when attaching a seal body (for example, an O ring) whose cross-section is circular.

What is claimed is:

1. An attachment unit for attaching a seal body in a manufacturing apparatus that manufactures an assembled product, which includes a component main body and a ring-shaped seal body that has been attached to a ring-shaped inner circumferential surface of the component main body, the attachment unit comprising:
   a pair of guide members that support the ring-shaped seal body to be attached to a ring-shaped channel formed in the inner circumferential surface of the component main body;
   a rod-shaped deformation engagement member that moves a portion of the seal body inward in a radial direction to cause deformation of the seal body, and holds the seal body by acting in concert with the pair of guide members, the rod-shaped deformation engagement member having a shaft, configured to extend in a direction parallel to a center axis of the seal body, the shaft having a curved surface and the curved surface of the shaft configured to engage an engaged portion of the seal body and move the engaged portion inward in the radial direction; and
   a ring attaching mechanism that moves the seal body supported by the ring pair of guide members to the attachment channel by acting in concert with the rod-shaped deformation engagement member and attaches the seal body by acting in concert with the rod-shaped deformation engagement member.

2. The attachment unit according to claim 1,
   wherein the pair of guide members, whose diameter is smaller than the inner circumferential diameter of the seal body, support the ring-shaped seal body while restricting deformation of the seal body in an intersecting direction that intersects the radial direction around a circumferential direction of the seal body and permitting movement of the seal body in the radial direction;
   a support portion formed by a first surface, a second surface and an engagement portion of the guide members that engages part of an inner circumferential portion of the seal body, and is formed so as to be capable of housing the seal body whose diameter has been reduced;
   a plurality of cutaway portions provided, at predetermined intervals, in a radial direction from a center axis side of the pair of guide portions; and
   an engagement cutaway portion that permits movement of the deformation engagement member.

3. The attachment unit according to claim 2,
   wherein the deformation engagement member is configured to move between an outer standby position set on an outer circumferential side of the pair of guide members and a holding position set on an inner circumferential side of the pair of guide members;
   the attachment unit comprising:
   a first deformation moving mechanism that reciprocally moves the deformation engagement member along the first surface between the outer standby position and the holding position; and
   a second moving mechanism that reciprocally moves the deformation engagement member in a direction that intersects the first surface between the holding position and an intersecting direction standby position.

4. The attachment unit according to claim 2,
   wherein the pair of guide members include:
   a first guide member that includes the first surface; and
   a second guide member that includes the second surface, wherein the first guide member and the second guide member include the plurality of cutaway portions and the second guide member further includes an engagement cutaway portion.

5. The attachment unit according to claim 4, comprising:
an intermediate member that is disposed between the first guide member and the second guide member and includes: a contacted surface that is contacted by the inner circumferential portion of the seal body; a movement permitting portion that permits movement of the deformation engagement member; and the engagement portion.

6. The attachment unit according to claim 1,
wherein the ring attachment mechanism includes:
a plurality of ring attachment members that are capable of moving between attachment positions, a plurality of which are set at predetermined intervals in a circumferential direction on an outer circumferential side of the pair of guide members, and standby positions, a plurality of which are set at predetermined intervals in a circumferential direction on a center axis side of the pair of guide members; and
an attachment moving mechanism that reciprocally moves the plurality of ring attaching members between the respective standby positions and the attachment positions.

* * * * *

UNITED STATES PATENT AND TRADEMARK OFFICE
CERTIFICATE OF CORRECTION

| | | |
|---|---|---|
| PATENT NO. | : 11,077,528 B2 | Page 1 of 1 |
| APPLICATION NO. | : 15/938534 | |
| DATED | : August 3, 2021 | |
| INVENTOR(S) | : Mitsuhiro Noda | |

It is certified that error appears in the above-identified patent and that said Letters Patent is hereby corrected as shown below:

In the Specification

Column 2, Line 33:
"(i.e., the elastic range is narrow)"
Should read:
-- (i.e., the elastic range is narrow). --

Column 17, Line 2:
"diagonal dimensions Wb and We of a cross section of the"
Should read:
-- diagonal dimensions Wb and Wc of a cross section of the --

Column 19, Line 41:
"than the diagonal dimension Wb and We of a cross-section"
Should read:
-- than the diagonal dimension Wb and Wc of a cross-section --

In the Claims

Column 20, Line 24:
"supported by the ring pair of guide members to the"
Should read:
-- supported by the pair of guide members to the --

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*